United States Patent
Takeuchi

(10) Patent No.: US 9,672,166 B2
(45) Date of Patent: Jun. 6, 2017

(54) ADDRESS INFORMATION MANAGEMENT APPARATUS AND METHOD

(71) Applicant: FUJITSU LIMITED, Kawasaki-shi, Kanagawa (JP)

(72) Inventor: Tamotsu Takeuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 14/722,204

(22) Filed: May 27, 2015

(65) Prior Publication Data

US 2015/0356032 A1 Dec. 10, 2015

(30) Foreign Application Priority Data

Jun. 5, 2014 (JP) ................. 2014-116731

(51) Int. Cl.
| | |
|---|---|
| *G06F 3/00* | (2006.01) |
| *G06F 12/00* | (2006.01) |
| *G06F 13/12* | (2006.01) |
| *G06F 12/06* | (2006.01) |
| *G06F 12/02* | (2006.01) |

(52) U.S. Cl.
CPC .......... *G06F 13/122* (2013.01); *G06F 12/023* (2013.01); *G06F 12/0653* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 5,835,760 A | * | 11/1998 | Harmer | ................. G06F 9/4401 713/2 |
| 2009/0216987 A1 | * | 8/2009 | Krishnan | ................ G06F 12/02 711/171 |
| 2010/0036995 A1 | | 2/2010 | Nakayama et al. | |
| 2013/0124775 A1 | | 5/2013 | Nakayama et al. | |

FOREIGN PATENT DOCUMENTS

JP 2010-039760 A 2/2010

* cited by examiner

*Primary Examiner* — David E Martinez
(74) *Attorney, Agent, or Firm* — Fujitsu Patent Center

(57) ABSTRACT

An information processing apparatus includes a storage unit and a processor. The storage unit stores a relationship between a device connected to the information processing apparatus and address information assigned to the device. The processor executes a process that causes the information processing apparatus to perform first assigning, when the relationship is stored in the storage unit at the startup of the information processing apparatus, the address information to the device connected to the information processing apparatus according to the relationship stored in the storage unit and updating, in response to a second assigning, the relationship stored in the storage unit, when further address information is assigned in the second assigning to the device connected to the information processing apparatus during operation of the information processing apparatus so that the further address information does not overlap the address information assigned to the device already connected to the information processing apparatus.

15 Claims, 18 Drawing Sheets

FIG.7

| UNIT 10 | DEVICE 11 | BUS NUMBER 12 |
|---|---|---|
| CPU UNIT 1 | PCI SWITCH - IO UNIT 1 CONNECTION | 0 |
| | PCI SWITCH - PCI UNIT 1 CONNECTION | 0 |
| CPU UNIT 2 | PCI SWITCH - IO UNIT 2 CONNECTION | 0 |
| | PCI SWITCH - PCI UNIT 2 CONNECTION | 0 |
| IO UNIT 1 | PCI SWITCH - VIDEO CONTROLLER CONNECTION | 0 |
| | PCI SWITCH - HARD DISK CONTROLLER CONNECTION | 0 |
| IO UNIT 2 | PCI SWITCH - VIDEO CONTROLLER CONNECTION | 0 |
| | PCI SWITCH - HARD DISK CONTROLLER CONNECTION | 0 |
| PCI UNIT 1 | PCI SWITCH - PCI CARD 1 CONNECTION | 0 |
| | PCI SWITCH - PCI CARD 2 CONNECTION | 0 |
| | PCI SWITCH - PCI CARD 3 CONNECTION | 0 |
| PCI UNIT 2 | PCI SWITCH - PCI CARD 1 CONNECTION | 0 |
| | PCI SWITCH - PCI CARD 2 CONNECTION | 0 |
| | PCI SWITCH - PCI CARD 3 CONNECTION | 0 |

| UNIT 10 | DEVICE 11 | BUS NUMBER 12 |
|---|---|---|
| CPU UNIT 1 | PCI SWITCH - IO UNIT 1 CONNECTION | 0 |
| | PCI SWITCH - PCI UNIT 1 CONNECTION | 4 |
| CPU UNIT 2 | PCI SWITCH - IO UNIT 2 CONNECTION | 0 |
| | PCI SWITCH - PCI UNIT 2 CONNECTION | 96 |
| IO UNIT 1 | PCI SWITCH - VIDEO CONTROLLER CONNECTION | 2 |
| | PCI SWITCH - HARD DISK CONTROLLER CONNECTION | 3 |
| IO UNIT 2 | PCI SWITCH - VIDEO CONTROLLER CONNECTION | 0 |
| | PCI SWITCH - HARD DISK CONTROLLER CONNECTION | 0 |
| PCI UNIT 1 | PCI SWITCH - PCI CARD 1 CONNECTION | 5 |
| | PCI SWITCH - PCI CARD 2 CONNECTION | 6 |
| | PCI SWITCH - PCI CARD 3 CONNECTION | 7 |
| PCI UNIT 2 | PCI SWITCH - PCI CARD 1 CONNECTION | 97 |
| | PCI SWITCH - PCI CARD 2 CONNECTION | 100 |
| | PCI SWITCH - PCI CARD 3 CONNECTION | 103 |

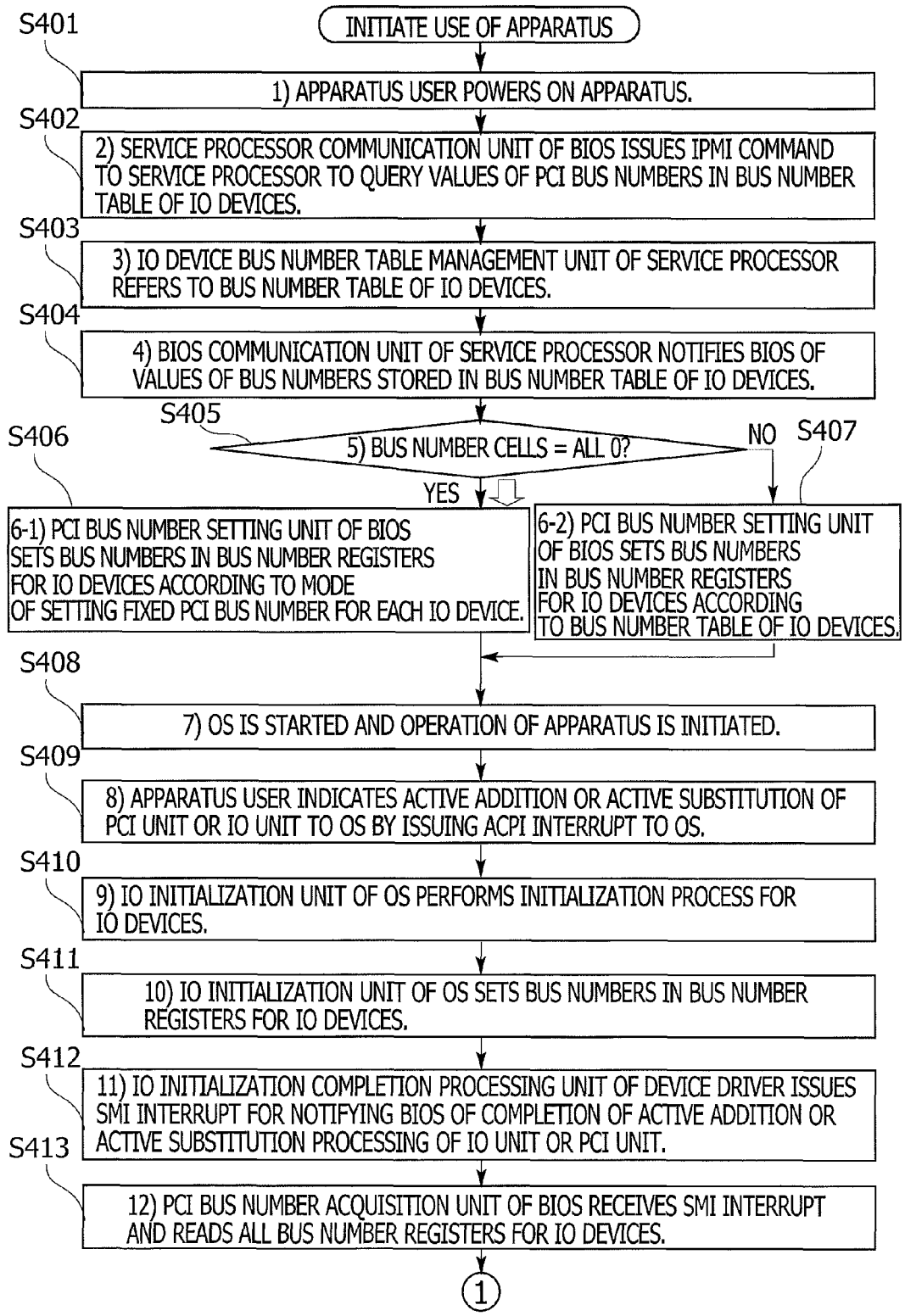

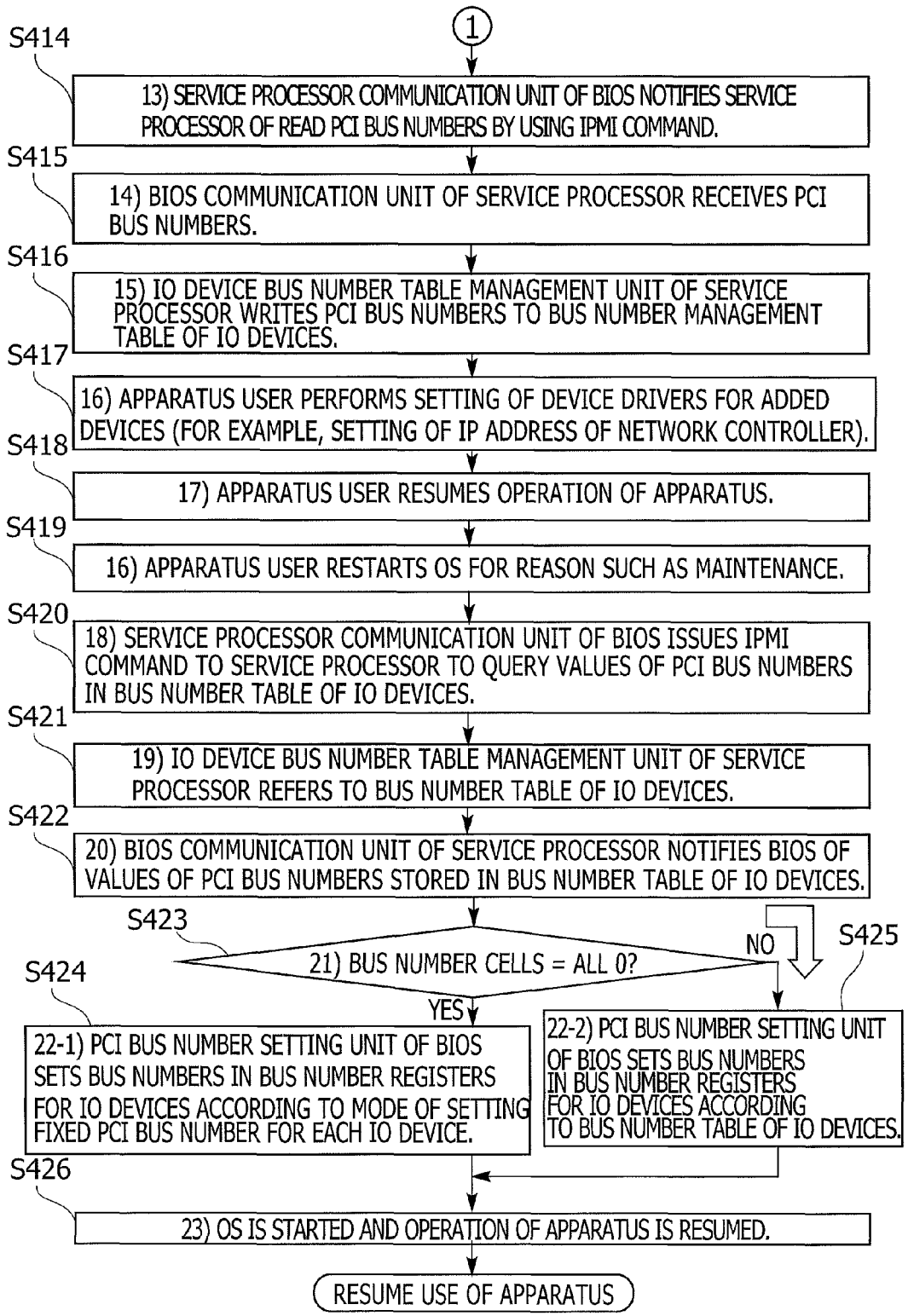

ADDRESS INFORMATION MANAGEMENT APPARATUS AND METHOD

CROSS-REFERENCE TO RELATED APPLICATION

This application is based upon and claims the benefit of priority of the prior Japanese Patent Application No. 2014-116731, flied on Jun. 5, 2014, the entire contents of which are incorporated herein by reference.

FIELD

The embodiments discussed herein are related to an information processing apparatus and an information processing method.

BACKGROUND

An Operating System (OS) running on an information processing apparatus uses input/output (IO) devices, such as a network controller and a video controller, based on address information. The address information is assigned to the IO devices by, for example, the Basic Input Output System (BIOS) or the OS. The address information assigned to the IO devices is typically stored in a volatile storage area. Accordingly, an assigned address information is erased when the information processing apparatus is shut down. The address information is therefore assigned to the IO devices by the BIOS or the OS every time the information processing apparatus is started.

More specifically, when IO devices are used, setting information on the IO devices is set in a device driver of the OS. The device driver of the OS will also be referred to as a device driver hereinafter. For example, when a network controller is used, network information such as an IP address is set as the setting information in the device driver.

DOCUMENT OF PRIOR ART

Patent Document

[Patent document 1] Japanese Laid-open Patent Publication No. 2010-39760

SUMMARY

An aspect of the technique to be disclosed is illustrated by an information processing apparatus as follows. The information processing apparatus includes a storage unit and a processor. The storage unit stores a relationship between a device connected to the information processing apparatus and address information assigned to the device. The processor executes a process that causes the information processing apparatus to perform first assigning, when the relationship is stored in the storage unit at the startup of the information processing apparatus, the address information to the device connected to the information processing apparatus according to the relationship stored in the storage unit and updating, in response to a second assigning, the relationship stored in the storage unit, when the further address information is assigned in the second assigning to the device connected to the information processing apparatus during operation of the information processing apparatus so that the further address information does not overlap the address information assigned to the device already connected to the information processing apparatus.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 7 is a diagram illustrating the initial state of a bus number table;

FIG. 11 is a diagram illustrating the bus number management table after the PCI unit is added;

FIG. 17 is a diagram illustrating a flow of processing in which a PCI unit is actively added or actively substituted in the information processing apparatus in the third embodiment; and FIG. 18 is a diagram illustrating the flow of the processing in which the PCI unit is actively added or actively substituted in the information processing apparatus in the third embodiment.

DESCRIPTION OF EMBODIMENTS

The BIOS or the OS typically assigns numbers of address information to IO devices in ascending order (for example, starting from No. 0). Therefore, if an IO device is added or disconnected, the address information assigned to the IO devices may be changed to values different from the previous values. Then, the IO devices with their address information changed may be recognized by the OS as different IO devices. Further, setting information on the IO devices set in the device driver may be erased due to the changes of the address information. Once the IO devices are recognized as different IO devices or the setting information on the IO devices is erased, using the IO devices involves a task of setting the setting information on the IO devices again. Thus, an aspect of a technique to be disclosed prevents changes of address information assigned to IO devices even if an IO device is added or disconnected.

An information processing apparatus according to an embodiment will be described below with reference to the drawings. The configuration of the embodiment to be described below is merely illustration, and the information processing apparatus is not limited to the configuration of the embodiment.

Example for Comparison

An example for comparison illustrates an information processing apparatus in which a range of address information assigned by the BIOS is predetermined for each IO device to prevent changes of the address information assigned to IO devices. The address information on each IO device is assigned not to overlap each other. The following description takes a bus number as an example of the address information. The example for comparison will be described below with reference to FIGS. 1 to 4.

Figure 1:
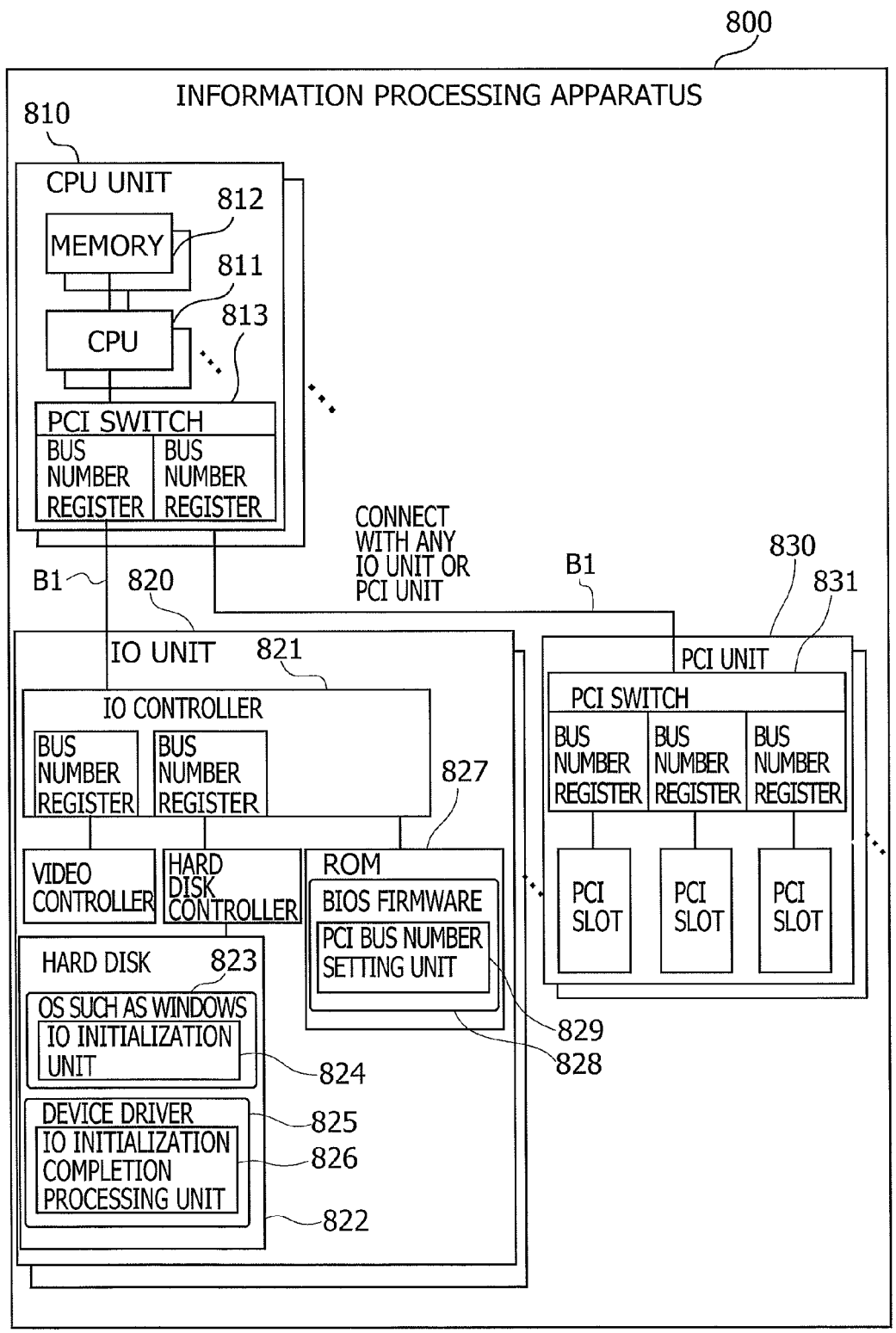
FIG. 1 is a diagram illustrating a configuration of an information processing apparatus in an example for comparison.

FIG. 1 is a diagram illustrating a configuration of an information processing apparatus 800 in the example for comparison. The information processing apparatus 800 includes a Central Processing Unit (CPU) unit 810, an IO unit 820, and a Peripheral Component Interconnect (PCI) unit 830. The IO unit 820 and the PCI unit 830 are connected with the CPU unit 810 via buses B1. The units such as the CPU unit 810, the IO unit 820, and the PCI unit 830 may each include one or more IO devices. A unit including one or more IO devices may also be regarded as one IO device as a whole. The information processing apparatus 800 may include multiple CPU units 810, multiple IO units 820, and multiple PCI units 830. In place of the PCI unit 830, any IO unit or PCI unit may be connected to the information processing apparatus 800. The IO unit 820 and the PCI unit 830 are examples of "devices." IO devices included in the IO unit 820, such as a video controller and a hard disk controller, are examples of "devices." Various peripheral devices connected via a PCI switch and PCI slots of the PCI unit 830 are also examples of "devices."

The CPU unit 810 performs arithmetic processing. The CPU unit 810 includes a CPU 811, a memory 812, and a PCI switch 813. The IO unit 820 and the PCI unit 830 are connected to the PCI switch 813. The PCI switch 813 has bus number registers that store bus numbers assigned to IO devices connected to the PCI switch 813. In FIG. 1, the IO unit 820 and the PCI unit 830 are illustrated as the devices connected to the PCI switch 813.

Various IO devices are connected to the IO unit 820. The IO unit 820 includes an IO controller 821 and a Read Only Memory (ROM) 827. In FIG. 1, a video controller and a hard disk controller are connected to the IO controller 821, for example. The IO controller 821 includes bus number registers that store bus numbers assigned to connected IO devices. A hard disk 822 is connected to the hard disk controller. The ROM 827 is nonvolatile memory. The ROM 827 stores a BIOS firmware 828, for example. The BIOS firmware 828 will also be referred to as a BIOS 828 hereinafter. The BIOS 828 includes a PCI bus number setting unit 829 that assigns bus numbers to IO devices.

The hard disk 822 serves as an auxiliary storage unit of the information processing apparatus 800. The hard disk 822 stores various programs and various types of data on a recording medium in a readable and writable manner. The hard disk 822 is also called an external storage device. The hard disk 822 stores an OS 823 (such as Windows®), various programs, various tables, and the like.

The auxiliary storage unit of the information processing apparatus 800 may be implemented in forms other than the hard disk 822. For example, the auxiliary storage unit may be implemented using Erasable Programmable ROM (EPROM) or a Solid State Disk (SSD). As another example, the auxiliary storage unit may be implemented using a Compact Disc (CD) drive device, Digital Versatile Disc (DVD) drive device, or Blu-Ray® Disc (BD) drive device. The auxiliary storage unit may also be implemented using Network Attached Storage (NAS) or Storage Area Network (SAN). The recording medium may be a silicon disk including nonvolatile semiconductor memory (flash memory), hard disk, CD, DVD, BD, or Universal Serial Bus (USB) memory, for example.

The OS 823 includes a communication interface program for exchanging data with external devices etc. connected via a communication unit (not illustrated). External devices etc. include, for example, other video processing devices or external storage devices connected via a network. The OS 823 includes an IO initialization unit 824. The IO initialization unit 824 assigns a bus number to an IO device added or substituted in the information processing apparatus 800 in operation. An IO device added or substituted in the information processing apparatus 800 in operation will be referred to as an actively added or actively substituted IO device hereinafter. A device driver 825 that controls IO devices connected to the information processing apparatus 800 is installed on the OS 823. The device driver 825 includes an IO initialization completion processing unit 826. The IO initialization completion processing unit 826 notifies the BIOS 828 of the completion of active addition or active substitution of an IO device. The OS 823 and the device driver 825 are loaded from the hard disk 822 onto the memory 812 of the CPU unit 810 and executed by the CPU 811.

The PCI unit 830 includes a PCI switch 831. PCI slots are connected to the PCI switch 831. The PCI switch 831 includes bus number registers that store bus numbers assigned to IO devices connected to the PCI slots.

The information processing apparatus 800 may further include a communication unit that serves as an interface with a network environment, for example a Local area Network (LAN) or the Internet. The communication unit communicates with external devices via the network environment.

The information processing apparatus 800 may further include an input unit that receives, for example, operational instructions from a user. An exemplary input unit may be an input device such as a keyboard, pointing device, touch panel, acceleration sensor, or voice input device.

The information processing apparatus 800 may include an output unit that outputs, for example, data processed by the CPU 811 or data stored in the memory 812. An exemplary output unit may be an output device such as a Cathode Ray Tube (CRT) display, Liquid Crystal Display (LCD), Plasma Display Panel (PDP), Electroluminescence (EL) panel, organic EL panel, or printer.

Figure 2:
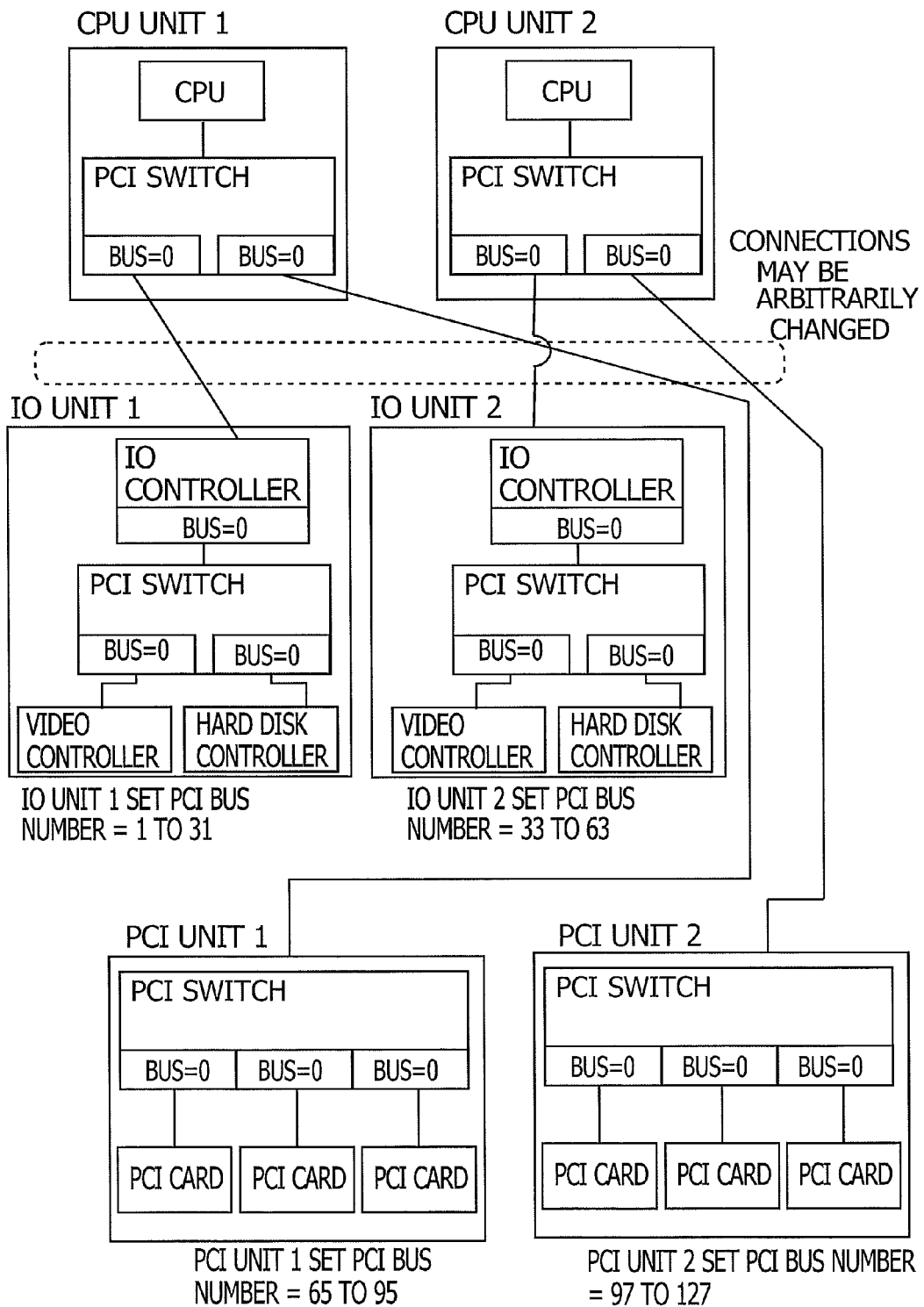
FIG. 2 is a diagram illustrating the example for comparison before bus numbers are assigned.

FIG. 2 is a diagram illustrating the example for comparison before bus numbers are assigned. FIG. 2 illustrates CPU units 1 and 2, IO units 1 and 2, and PCI units 1 and 2. The IO unit 1 and the PCI unit 1 are connected to the CPU unit 1. The IO unit 2 and the PCI unit 2 are connected to the CPU unit 2. In the state of FIG. 2, bus numbers are not assigned yet by the BIOS 828 or the OS 823 and therefore are set to the initial value 0. In FIG. 2, the values of the bus numbers are represented as "BUS=0."

Bus numbers are assigned to IO devices by the PCI bus number setting unit 829 of the BIOS 828 or by the IO initialization unit 824 of the OS 823. The assigned bus numbers are stored in the bus number registers. To IO devices already connected at the startup of the information processing apparatus 800, the PCI bus number setting unit 829 of the BIOS 828 assigns bus numbers. To actively added or actively substituted IO devices, the IO initialization unit 824 of the OS 823 assigns bus numbers. For example, the IO initialization unit 824 assigns bus numbers to IO devices in ascending order, starting from an unassigned bus number.

Bus numbers are typically assigned in ascending order to IO devices (for example, starting from No. 0). Assigning bus numbers in this manner may cause changes of the bus numbers assigned to the IO devices in such a case as follows.

For example, consider the case in which the IO unit 1 is removed in the configuration illustrated in FIG. 2. The information processing apparatus 800 is then started, and the BIOS 828 assigns a bus number to each IO device. Since the IO unit 1 has been removed, the bus numbers are assigned sequentially from the IO unit 2. As a result, compared with the state in which the IO unit 1 was connected, different bus numbers may be assigned to the IO devices.

In order to alleviate the above problem, in the example for comparison, a range of bus numbers to be assigned by the PCI bus number setting unit 829 is specified for each unit. For example, to the IO unit 1 in FIG. 2, the PCI bus number setting unit 829 assigns bus numbers in the range from 1 to 31. In this manner, even if the IO unit 1 is removed while the information processing apparatus 800 is shut down, bus numbers in a predetermined range are assigned by the PCI bus number setting unit 829 to each unit such as the IO unit 2. As a result, the bus numbers assigned to each unit such as the IO unit 2 are unchanged even if the IO unit 1 is removed while the information processing apparatus 800 is shut down. This mode of assigning bus numbers based on the bus number range specified for each unit will be referred to as a "fixed bus number assignment mode" hereinafter.

Figure 3:
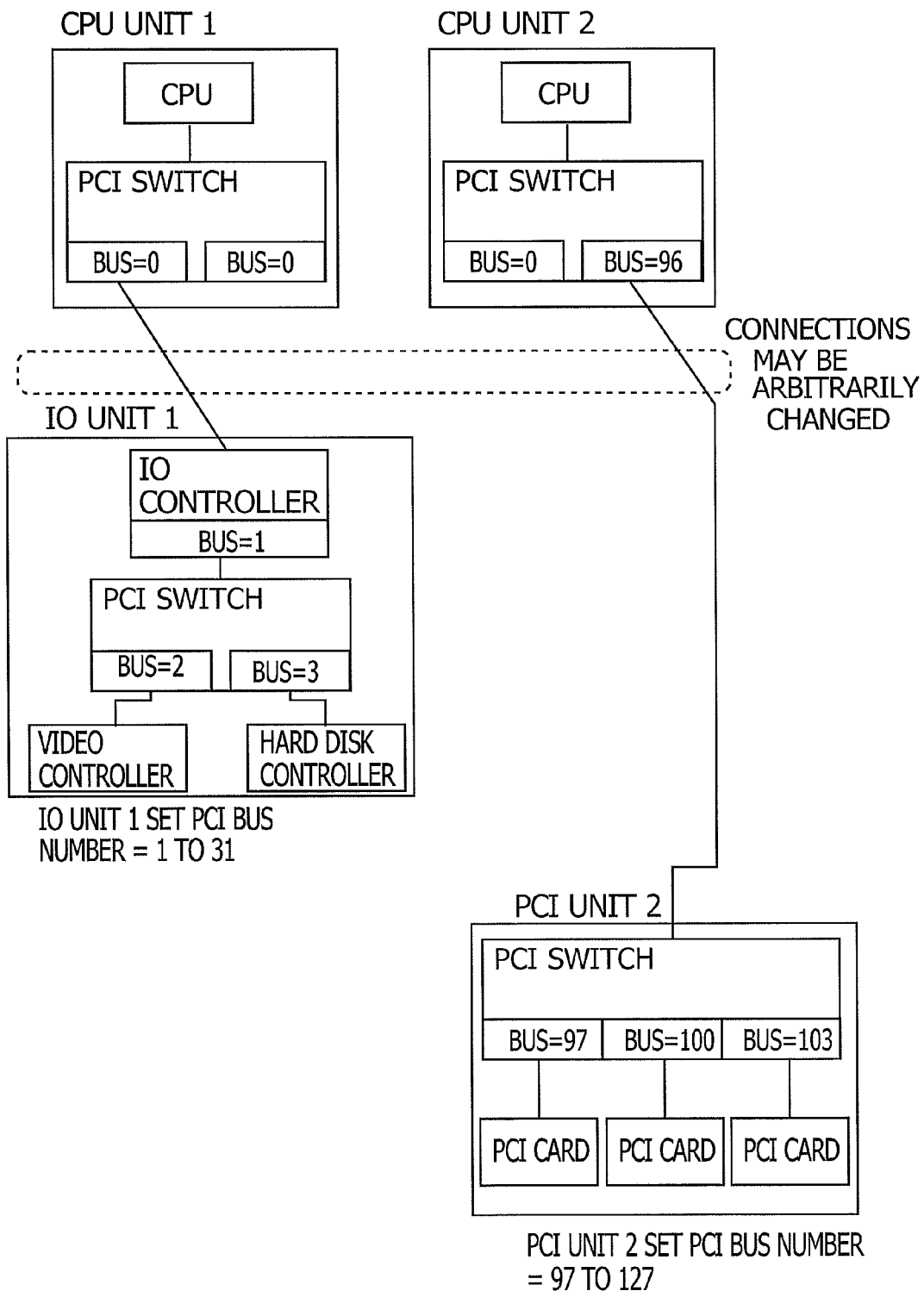
FIG. 3 is a diagram illustrating the example for comparison after bus numbers are assigned.

FIG. 3 is a diagram illustrating the example for comparison after bus numbers are assigned. In FIG. 3, each IO device is assigned a bus number. For example, a PCI switch of the IO unit 1 in FIG. 3 is assigned a bus number 1. The video controller is assigned a bus number 2. Further, the hard disk controller is assigned a bus number 3.

Figure 4:
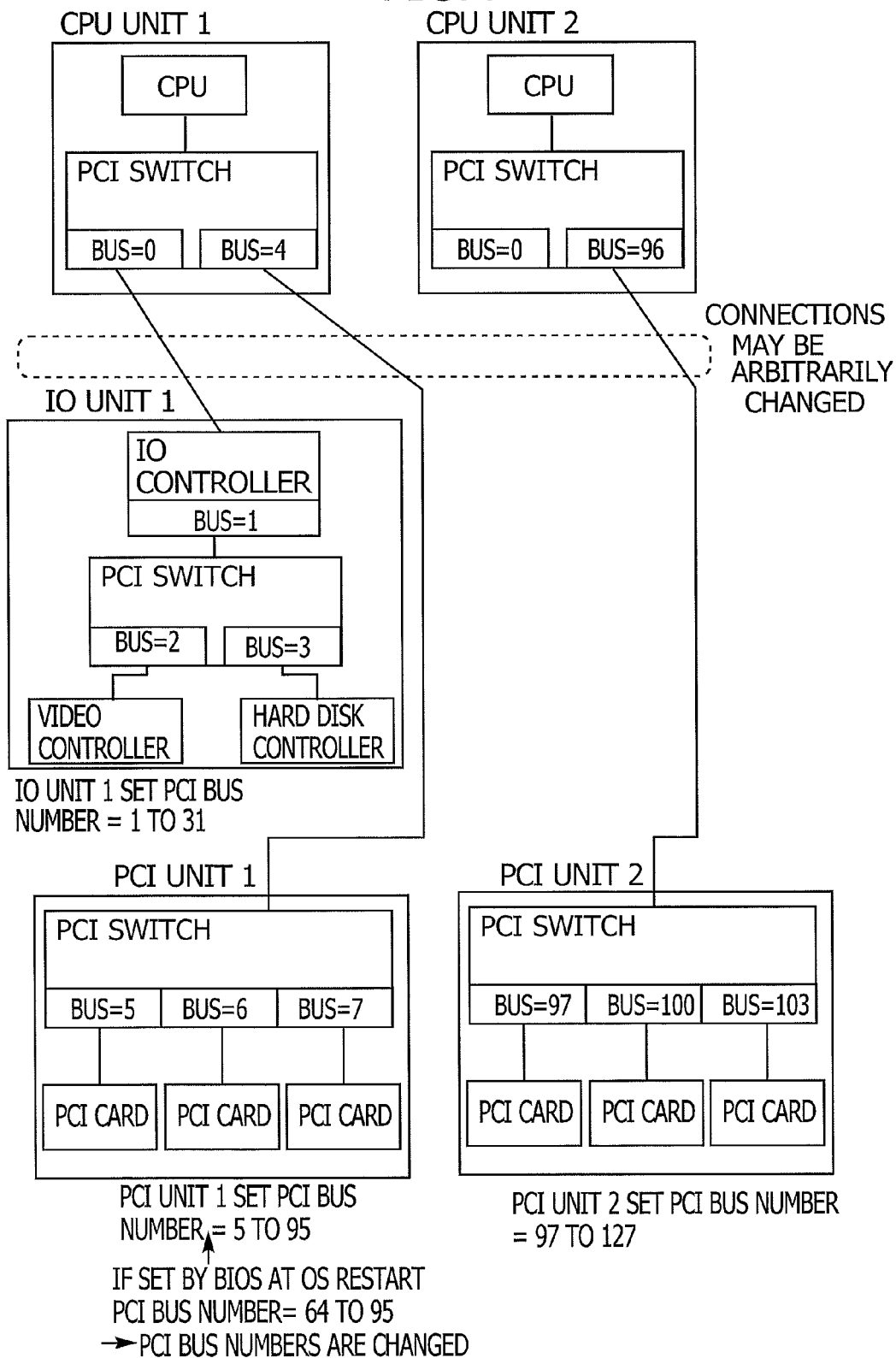
FIG. 4 is a diagram illustrating the example for comparison after a PCI unit is actively added.

FIG. 4 is a diagram illustrating the example for comparison where the PCI unit 1 is actively added. In FIG. 4, the PCI unit 1 is actively added in the state of FIG. 3. To the actively added PCI unit 1, the IO initialization unit 824 of the OS 823 assigns bus numbers. The IO initialization unit 824 assigns bus numbers to the IO devices in ascending order, starting from an unassigned bus number. As a result, in FIG. 4, bus numbers 4 to 7 are assigned to the actively added PCI unit 1 and the IO devices included in the PCI unit 1.

If the information processing apparatus 800 is restarted in this state, the bus numbers stored in the bus number registers are erased. Upon restart of the information processing apparatus 800, the PCI bus number setting unit 829 of the BIOS 828 assigns bus numbers to the IO devices. As illustrated in FIG. 2, the bus number assignment by the PCI bus number setting unit 829 results in bus numbers in the range from 65 to 95 assigned to the PCI unit 1. Thus, the PCI unit 1 is assigned the bus numbers by the PCI bus number setting unit 829 that are different from the ones assigned by the IO initialization unit 824 of the OS 823 when actively added.

In the example for comparison, the IO initialization unit 824 of the OS 823 and the PCI bus number setting unit 829 of the BIOS 828 assign, independently from each other, bus numbers to IO devices. Further, the assigned bus numbers are erased when the information processing apparatus 800 is restarted. Therefore, if the information processing apparatus 800 is restarted after active addition or active substitution of an IO device, the PCI bus number setting unit 829 may assign bus numbers different from the ones assigned by the IO initialization unit 824.

First Embodiment

In the example for comparison, upon restart of the information processing apparatus 800, IO devices may be assigned bus numbers by the BIOS 828 that are different from bus numbers assigned by the OS 823. In a first embodiment, bus numbers assigned to IO devices are stored in a nonvolatile storage unit. The BIOS refers to the storage unit to assign the bus numbers to the IO devices, so that changes of the bus numbers assigned to the IO devices are prevented. The first embodiment will be described below with reference to FIGS. 5 to 12. Components common with the example for comparison will be given the same symbols and not be described.

Figure 5:
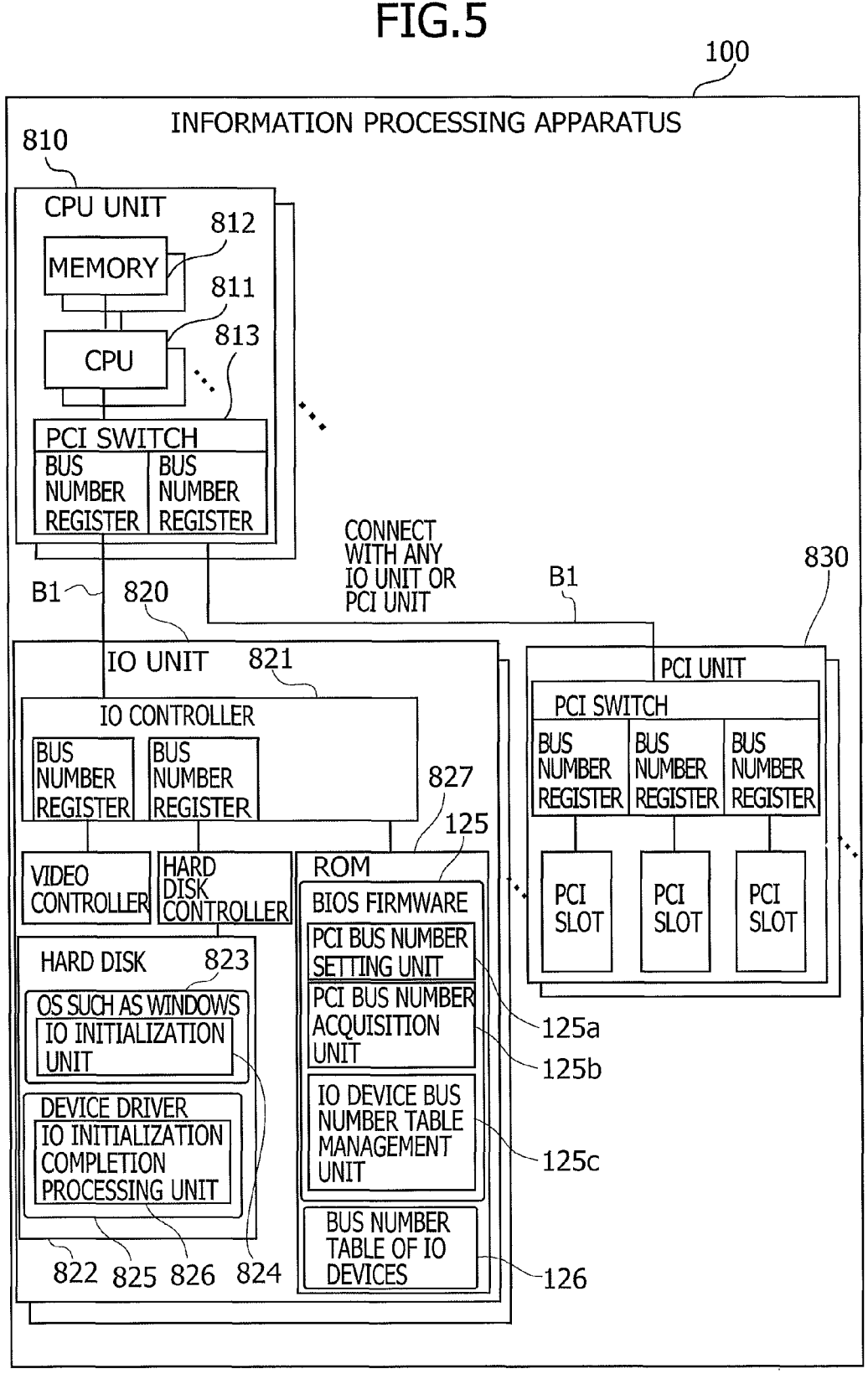
FIG. 5 is a diagram illustrating a configuration of an information processing apparatus in a first embodiment.

FIG. 5 is a diagram illustrating a configuration of an information processing apparatus 100 in the first embodiment. The information processing apparatus 100 is different from the information processing apparatus 800 in that the ROM 827 includes a BIOS firmware 125 and a bus number table 126 of IO devices.

The BIOS 125 performs processing, such as initialization processing for IO devices etc. connected to the information processing apparatus 100. The BIOS 125 assigns bus numbers to IO devices already connected to the information processing apparatus 100 at the time of startup. The BIOS firmware 125 will also be referred to as a BIOS 125 hereinafter. The bus number of each IO device is assigned not to overlap each other. The bus number is an example of "address information."

The bus number table 126 stores information identifying IO devices, and bus numbers assigned to the IO devices. The information identifying IO devices includes, for example, information on connection paths through which the IO devices are connected. The bus number table 126 of IO devices will also be referred to as a bus number table 126 hereinafter. The bus number table 126 is an example of a "storage unit."

The BIOS 125 includes a PCI bus number setting unit 125a, a PCI bus number acquisition unit 125b, and an IO device bus number table management unit 125c. The PCI bus number setting unit 125a refers to the information stored in the bus number table 126 to assign the bus numbers to the IO devices. The PCI bus number setting unit 125a is an example of a "first assigning." The PCI bus number acquisition unit 125b acquires the bus numbers assigned to the IO devices. The IO device bus number table management unit 125c stores, in the bus number table 126, correspondences between the bus numbers acquired by the PCI bus number acquisition unit 125b and the IO devices with the bus numbers assigned thereto. The IO device bus number table management unit 125c also reads the information stored in the bus number table 126. The IO device bus number table management unit 125c is an example of a "updating."

<Processing Blocks of Information Processing Apparatus 100>

Figure 6:
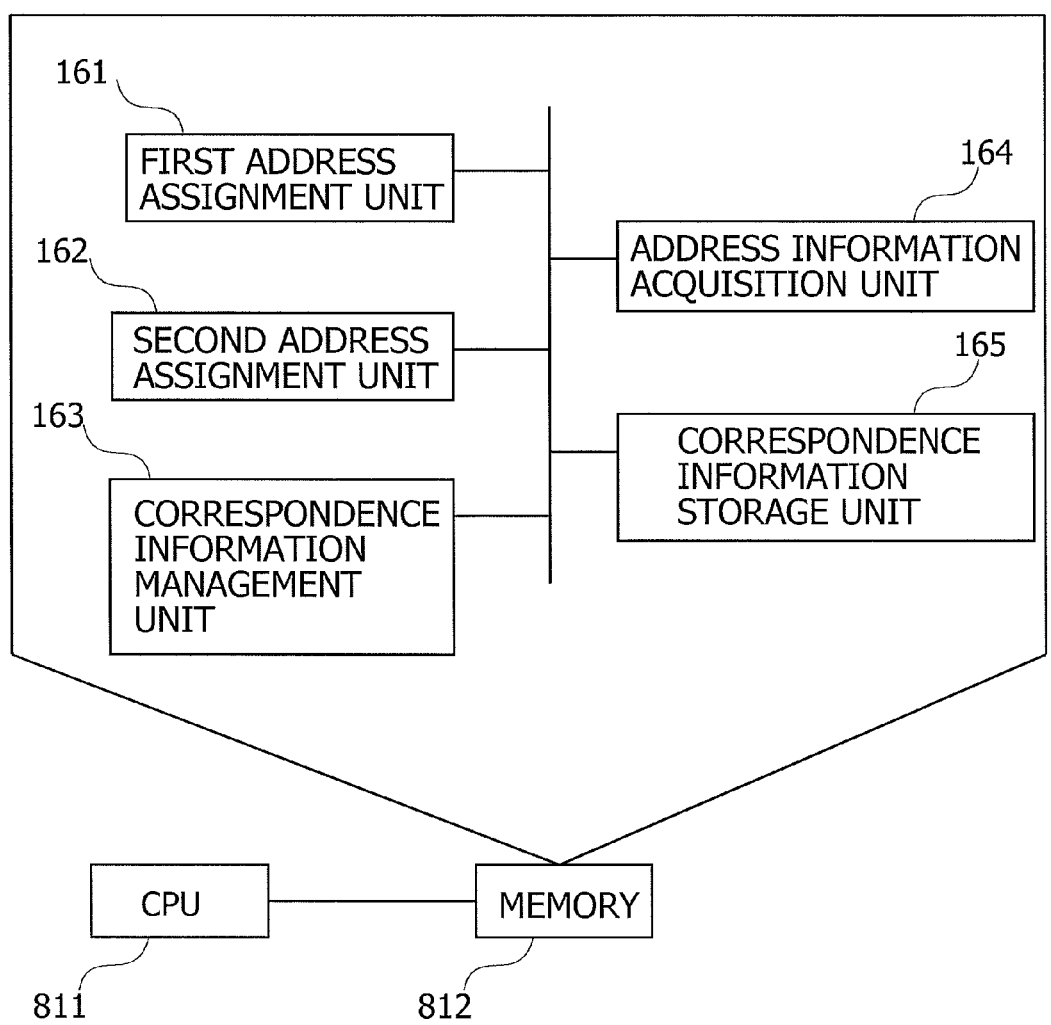
FIG. 6 is a diagram illustrating processing blocks of the information processing apparatus.

FIG. 6 is a diagram illustrating processing blocks of the information processing apparatus 100. FIG. 6 illustrates the CPU 811 and the memory 812. FIG. 6 further illustrates processing blocks loaded onto the memory 812. As the processing blocks, FIG. 6 illustrates a first address assignment unit 161, a second address assignment unit 162, a correspondence information management unit 163, an address information acquisition unit 164, and a correspondence information storage unit 165. For example, the CPU 811 in FIG. 5 executes a computer program executably loaded as the processing blocks in FIG. 6 onto the memory 812. However, any block in FIG. 6 may at least partially include a hardware circuit.

The CPU 811, as the first address assignment unit 161, refers to information stored in the correspondence information storage unit 165 to assign address information to IO devices already connected to the information processing apparatus 100 at the time of startup. The first address assignment unit 161 is an example of the "first assigning."

The CPU 811, as the second address assignment unit 162, assigns address information to IO devices connected to the information processing apparatus 100 in operation. The second address assignment unit 162 is an example of the "second assigning."

The CPU 811, as the correspondence information management unit 163, stores correspondences between address information acquired by the address information acquisition unit 164 and IO devices with the address information assigned thereto, in the correspondence information storage unit 165. The correspondence information management unit 163 also reads the information stored in the correspondence information storage unit 165. The correspondence information management unit 163 is an example of the "updating." The correspondence information storage unit 165 is an example of the "storage unit."

The CPU 811, as the address information acquisition unit 164, acquires address information assigned to IO devices.

FIG. 7 is a diagram illustrating the initial state of the bus number table 126. The bus number table 126 stores information of unit 10, device 11, and bus number 12. Unit 10 stores unit names of units connected to the information processing apparatus 100. Device 11 stores connection paths from the units with their unit names stored in unit 10 to IO devices. Unit name 10 and device 11 together identify the connection path from an IO device to the information processing apparatus 100. That is, an IO device is identified by information stored in unit name 10 and device 11. The bus number table 126 stores, in advance, information on units and IO devices that may be connected to the information processing apparatus 100. Bus number 12 stores bus numbers assigned to the IO devices. In the state of FIG. 7, a bus number 0 illustrating the initial value is stored.

Figure 8:
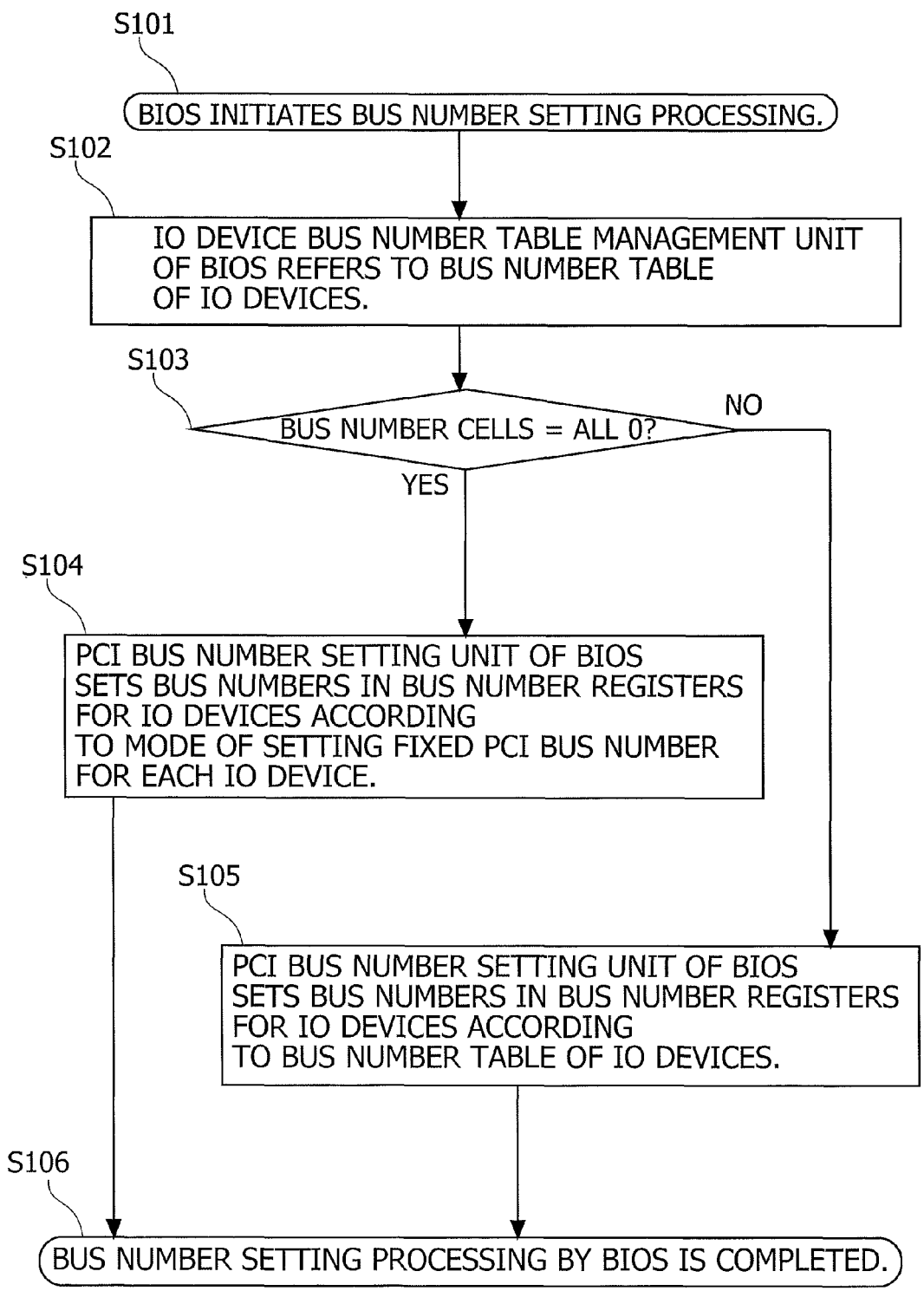
FIG. 8 is a diagram illustrating a flow of processing of assigning bus numbers to IO devices by the BIOS.

FIG. 8 is a diagram illustrating a flow of processing of assigning bus numbers to IO devices by the BIOS 125. With reference to FIG. 8, processing will be described below in which the BIOS 125 assigns bus numbers to IO devices already connected to the information processing apparatus 100 at the time of startup.

In S101, the information processing apparatus 100 is started. Upon startup of the information processing apparatus 100, the BIOS 125 scans the buses B1 in the information processing apparatus 100 to detect IO devices connected to the information processing apparatus 100.

In S102, the IO device bus number table management unit 125c refers to the bus number table 126.

If the values stored in bus number 12 of the bus number table 126 are all 0 (Yes in S103), the processing proceeds to S104. If values other than 0 are stored in bus number 12 of the bus number table 126 (No in S103), the processing proceeds to S105.

In S104, the PCI bus number setting unit 125a assigns bus numbers to the IO devices according to the fixed bus number assignment mode. The assigned bus numbers are stored in the bus number registers for the respective IO devices. The "fixed bus number assignment mode" is an example of a "predetermined procedure." The process in S104 is an example of a "first assigning."

In S105, the PCI bus number setting unit 125a assigns bus numbers to the IO devices according to the bus number table 126. The assigned bus numbers are stored in the bus number registers for the respective IO devices. The process in S105 is an example of the "first assigning."

Through the above processes, the information processing apparatus 100 assigns the bus numbers to the IO devices (S106).

Figure 9:
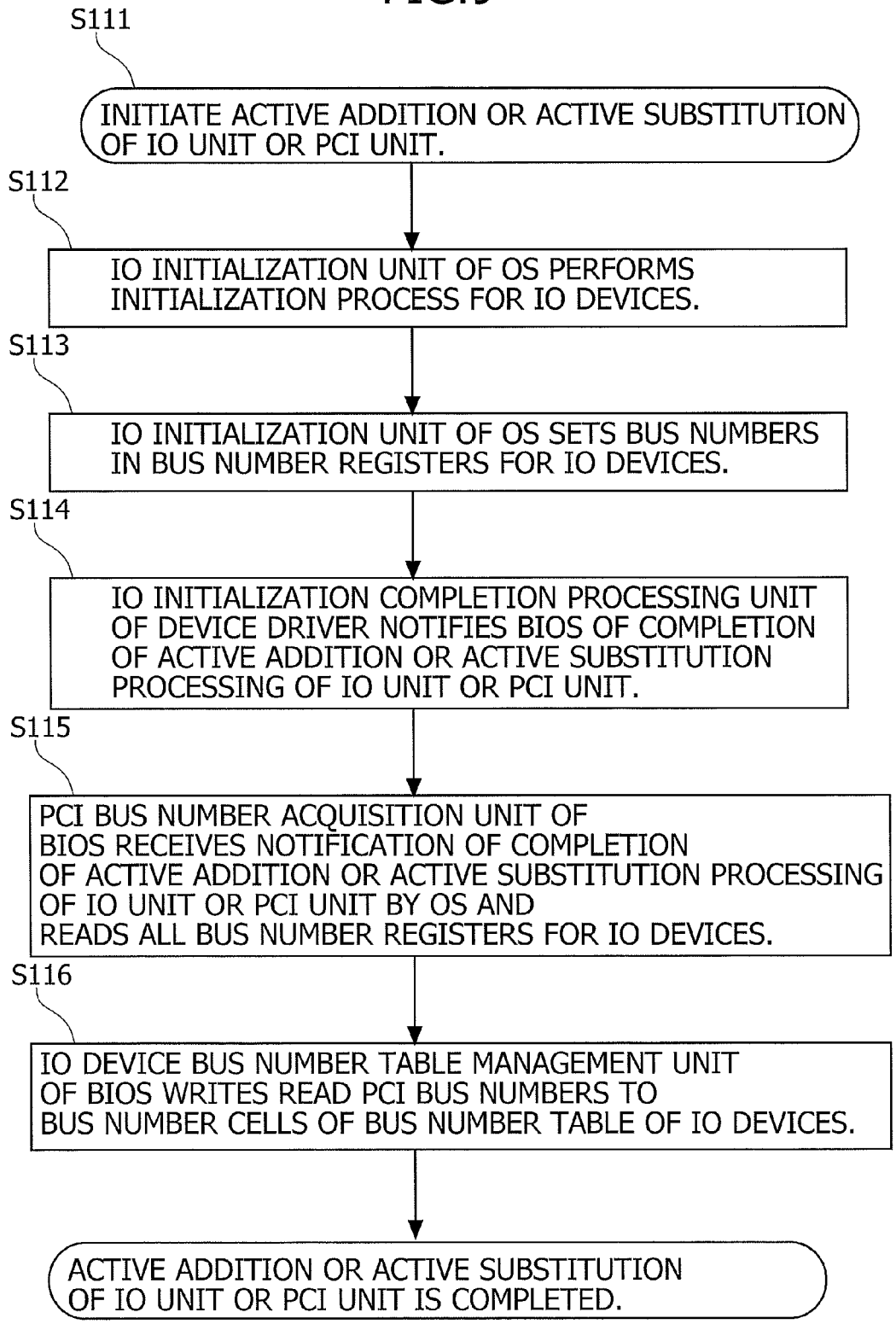
FIG. 9 is a diagram illustrating a flow of processing of actively adding or actively substituting IO devices.

FIG. 9 is a diagram illustrating a flow of processing of actively adding or actively substituting IO devices. FIG. 8 has described the processing of assigning bus numbers to IO devices already connected to the information processing apparatus 100 at the time of startup. FIG. 9 describes processing in which IO devices are added or substituted in the information processing apparatus 100 in operation.

In S111, an IO unit or a PCI unit is actively added or actively substituted in the information processing apparatus 100.

In S112 to S113, the IO initialization unit 824 of the OS 823 performs an initialization process for IO devices actively added or actively substituted in S111. For example, as the initialization process for the IO devices, the IO initialization unit 824 assigns bus numbers to the IO devices. The assigned bus numbers are stored in the bus number registers for the respective IO devices. The process in S113 is an example of the "second assigning."

In S114, the IO initialization completion processing unit 826 of the device driver 825 notifies the BIOS 125 of the completion of the active addition or active substitution of the IO unit or the PCI unit. The process in S114 is an example of the process of "notification of completion of address assignment by the second assigning."

In S115, the PCI bus number acquisition unit 125b of the BIOS 125 receives the notification in S114 and reads all bus number registers for IO devices.

In S116, the IO device bus number table management unit 125c stores each bus number read in S115 in the column of bus number 12 of the bus number table 126, in a row corresponding to the connection path from the relevant IO device with the bus number read in S115 to the information processing apparatus 100 (see the columns of unit 10 and device 11 in FIG. 7). The process in S116 is an example of the "updating."

Through the above processes, the active addition or active substitution of the IO devices in the information processing apparatus 100 is performed.

Figure 10:
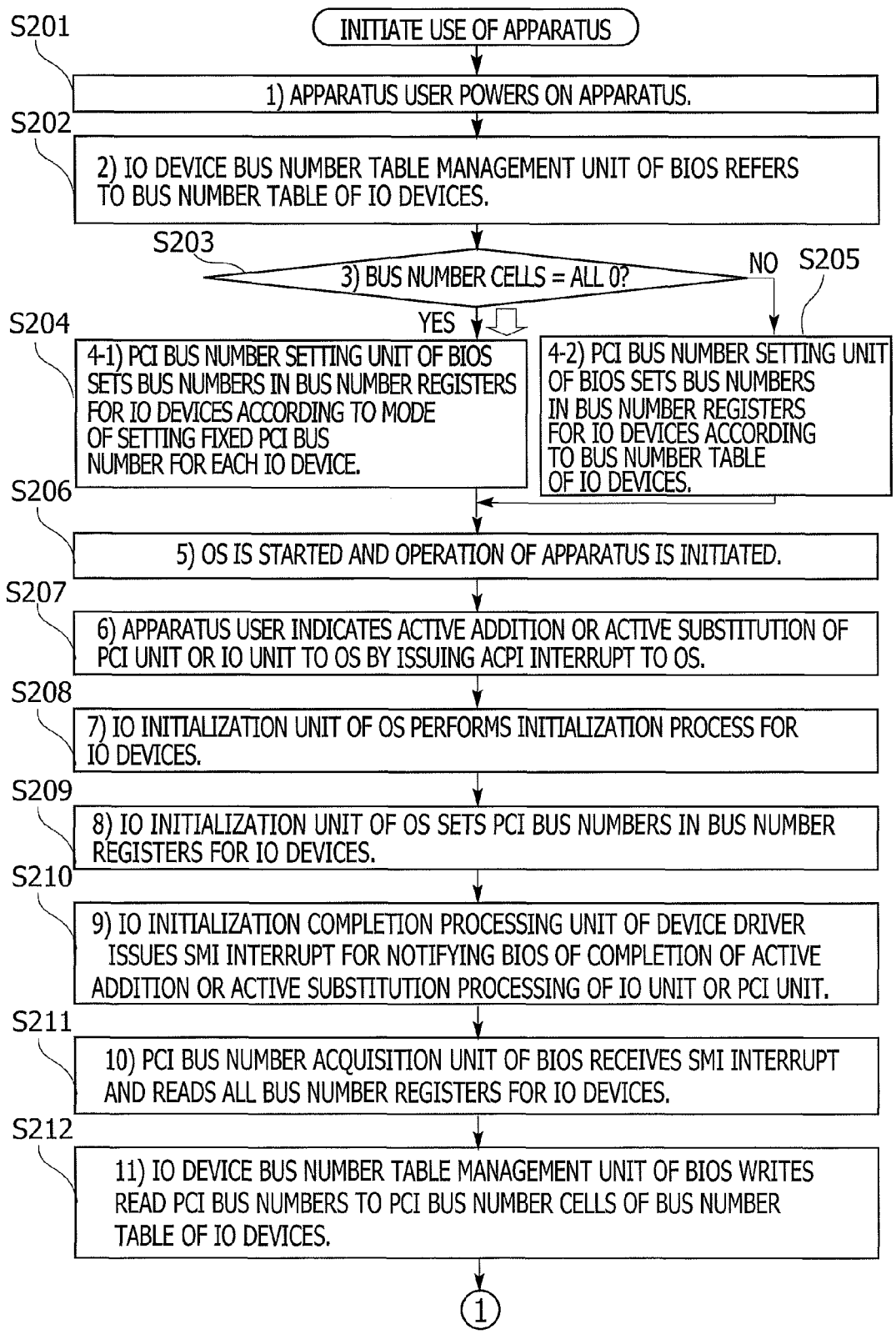
FIG. 10 is a diagram illustrating a flow of processing in which a PCI unit is actively added or actively substituted in the information processing apparatus in the first embodiment.
Figure 12:
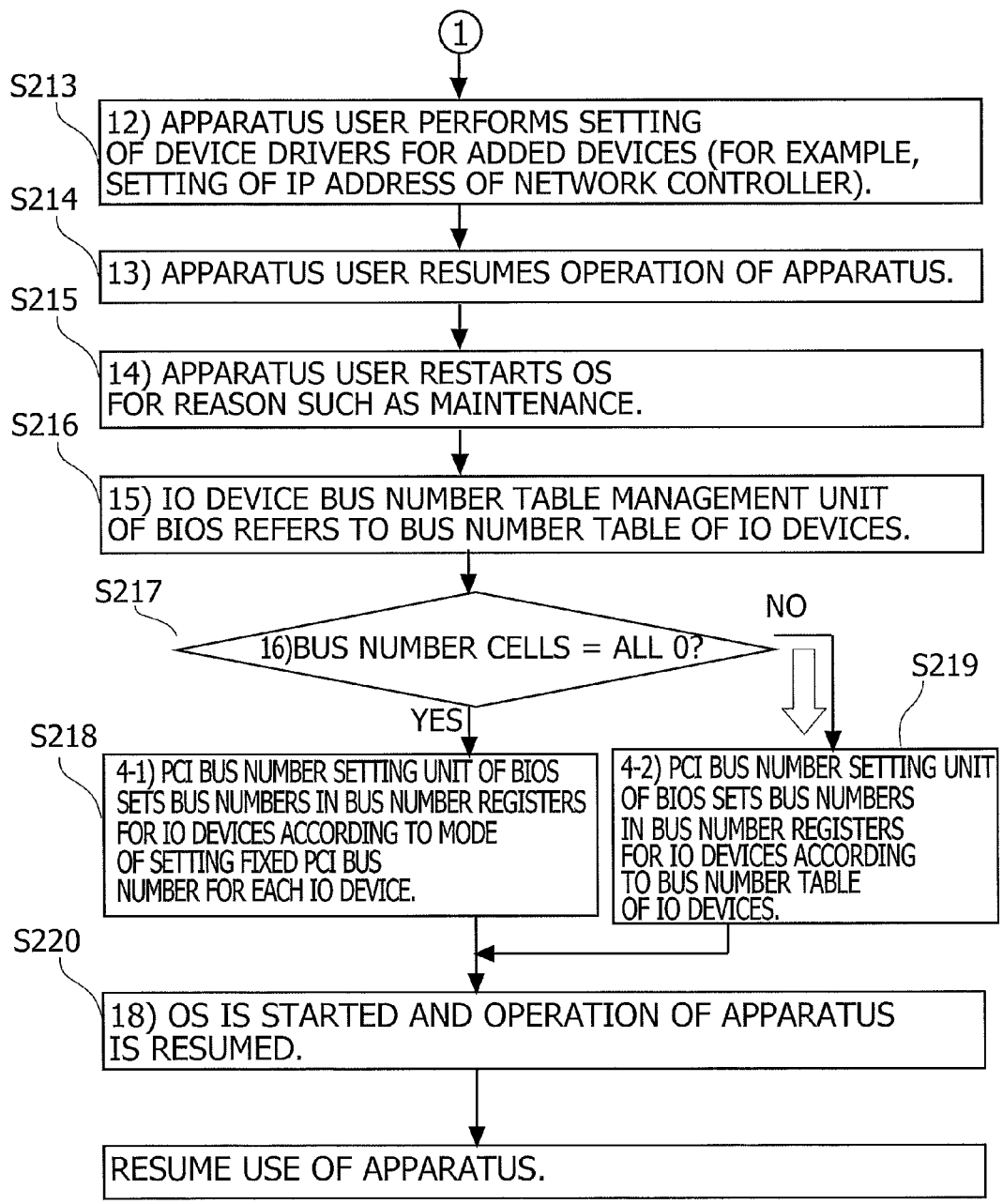
FIG. 12 is a diagram illustrating the flow of the processing in which the PCI unit is actively added or actively substituted in the information processing apparatus in the first embodiment.

FIGS. 10 and 12 are diagrams illustrating a flow of processing in which a PCI unit is actively added or actively substituted in the information processing apparatus 100 in the first embodiment. FIG. 11 is a diagram illustrating the bus number management table 126 after the PCI unit is added through the processing illustrated in FIG. 10. Description here assumes that the PCI unit 1 is actively added as in FIG. 4 to the information processing apparatus 100 started in the configuration of FIG. 3. The flow of processing in which a PCI unit is actively added or actively substituted in the information processing apparatus 100 will be described below with reference to FIGS. 10 to 12.

S201 to S206 describe processes at the startup of the information processing apparatus 100.

In S201, the information processing apparatus 100 is powered on. In S202, the IO device bus number table management unit 125c refers to the bus number table 126. The IO device bus number table management unit 125c checks whether the bus numbers stored in bus number 12 of the bus number table 126 are all 0.

If the bus numbers stored in bus number 12 are all 0 (Yes in S203), the processing proceeds to S204. If the bus numbers stored in bus number 12 include values other than 0 (No in S203), the processing proceeds to S205. Since the information processing apparatus 100 is started for the first time here, the bus numbers stored in bus number 12 are all 0. Accordingly, the processing proceeds to step S204.

In S204, the PCI bus number setting unit 125a assigns bus numbers to the bus number registers for the IO devices according to the fixed bus number assignment mode. The "fixed bus number assignment mode" is an example of the "predetermined procedure." The process in S204 is an example of the "first assigning."

In S205, the PCI bus number setting unit 125a assigns bus numbers to the IO devices based on the information stored in the bus number table 126.

In S206, the OS 823 of the information processing apparatus 100 is started, and the operation of the information processing apparatus 100 is initiated.

S207 to S209 describe processes of actively adding the PCI unit 1 to the information processing apparatus 100.

In S207, the PCI unit 1 is added to the information processing apparatus 100. The OS 823 is notified of the addition of the PCI unit 1. For example, the OS 823 is notified of the addition of the PCI unit 1 by an interrupt. An exemplary interrupt is an Advanced Configuration and Power Interface (ACPI) interrupt. An ACPI interrupt is also called a System Control Interrupt (SCI) interrupt. ACPI is an interface for enabling the OS 823 of the information processing apparatus 100 to recognize an IO device, for example. The SCI interrupt notifies the OS 823 of an event detected by the ACPI, for example. An exemplary event detected by ACPI is active addition or active substitution of an IO device.

In S208 to S209, the IO initialization unit 824 performs an initialization process for the added PCI unit 1. As the initialization process, for example, the IO initialization unit 824 assigns bus numbers to the PCI unit 1 and the IO devices included in the PCI unit 1. The assigned bus numbers are stored in the bus number registers.

In S210 to S212, processes of storing the bus numbers assigned by the IO initialization unit 824 in the bus number table 126 are performed.

In S210, the IO initialization completion processing unit 826 notifies the BIOS 125 of the completion of the active addition of the PCI unit 1. For example, a System Management Interrupts (SMI) interrupt is used for the notification. The SMI interrupt is an interrupt for causing the CPU 811 of the information processing apparatus 100 to transition to a system management mode, for example. The process in S210 is an example of the process of "notification of completion of address assignment by the second assigning."

In S211, the PCI bus number acquisition unit 125b receives the SMI interrupt in S210 and reads the bus number registers for all IO devices connected to the information processing apparatus 100.

In S212, the IO device bus number table management unit 125c writes each bus number read by the PCI bus number acquisition unit 125b to the column of bus number 12 of the bus number table 126, in a row corresponding to the connection path from the relevant IO device with the bus number read in S211 to the information processing apparatus 100 (see the columns of unit 10 and device 11 in FIG. 7). The process in S212 is an example of the "updating."

Through the above processes, the bus numbers of the IO devices connected to the information processing apparatus 100 are stored in the bus number table 126.

FIG. 11 is a diagram illustrating the bus number management table 126 after the PCI unit 1 is added as described in FIG. 10. With reference to FIG. 11, the bus number management table 126 stores the bus numbers assigned by the BIOS 125 and the bus numbers assigned by the OS 823. For example, in FIG. 11, the bus numbers assigned by the BIOS 125 are bus numbers of the IO unit 1 and the PCI unit 2, and the bus numbers assigned by the OS 823 are bus numbers of the PCI unit 1. Each row of the bus number management table 126 stores the relationship between an IO device connected to the information processing apparatus 100 (unit 10 and device 11) and the bus number assigned to that IO device (bus number 12). The combination of unit name 10, device 11, and bus number 12 of the bus number management table 126 is an example of "relationship."

With reference to FIG. 12, processing will be described in which the information processing apparatus 100 is restarted after the active addition of the PCI unit 1 through the processing of FIG. 10.

In S213 to S214, use of the information processing apparatus 100 with the PCI unit 1 added thereto is initiated.

In S213, setting information is set in the device drivers for the actively added IO devices. If an actively added IO device is a network controller, information such as the IP address may be set as the setting information.

In S214, operation of the information processing apparatus 100 with the PCI unit 1 added thereto is initiated. In S215, the information processing apparatus 100 is restarted. For example, the restart of the information processing apparatus 100 occurs in the case of application of a security patch, modification of the settings of the information processing apparatus 100, or maintenance.

S216 to S219 illustrate processes during the startup of the information processing apparatus 100. In S216 to S219, the PCI bus number setting unit 125a of the BIOS 125 assigns bus numbers to the IO devices.

The processes in S216 to S218 are the same as in S202 to S204 of FIG. 10 and therefore will not be described.

The processes in S219 to S220 are the same as in S205 to S206 of FIG. 10 and therefore will not be described.

In the first embodiment, bus numbers of IO devices connected to the information processing apparatus 100 are stored in the bus number table 126 in response to active addition or active substitution of an IO device. Thus, in the first embodiment, bus numbers assigned by the PCI bus number setting unit 125a of the BIOS 125 and by the IO initialization unit 824 of the OS 823 can be stored in the bus number table 126.

In the first embodiment, the bus numbers assigned by the PCI bus number setting unit 125a of the BIOS 125 and by the IO initialization unit 824 of the OS 823 are stored in the bus number table 126. In the first embodiment, upon startup of the information processing apparatus 100, the PCI bus number setting unit 125a of the BIOS 125 determines whether or not bus numbers assigned to the IO devices are stored in the bus number table 126. If bus numbers assigned to the IO devices are stored in the bus number table 126, the PCI bus number setting unit 125a of the BIOS 125 refers to the bus number table 126 to assign the bus numbers to the IO devices. Thus, in the first embodiment, changes of the bus numbers assigned to the IO devices are prevented even when the information processing apparatus 100 is restarted after active addition or active substitution of an IO device. That is, after the information processing apparatus 100 is restarted, the bus numbers assigned to the IO devices before shutdown of the information processing apparatus 100 by the PCI bus number setting unit 125a of the BIOS 125 and by the IO initialization unit 824 of the OS 823 are still assigned to the same IO devices as before the shutdown.

The bus number table 126 in the first embodiment stores, in association with the respective IO devices, the bus numbers assigned to the IO devices before the shutdown of the information processing apparatus 100 by the PCI bus number setting unit 125a and by the IO initialization unit 824. Therefore, the PCI bus number setting unit 125a can acquire the bus numbers assigned to the IO devices from the bus number table 126 even when the information processing apparatus 100 is restarted after active addition or active substitution of multiple IO devices. Thus, in the first embodiment, changes of the bus numbers assigned to the IO devices are prevented even when the information processing apparatus 100 is restarted after active addition or active substitution of multiple IO devices.

Second Embodiment

In the first embodiment, the BIOS 125 acquires bus numbers of IO devices connected to the information processing apparatus 100. The acquired bus numbers are stored by the BIOS 125 in the bus number table 126. In a second embodiment, the device driver acquires bus numbers of IO devices connected to the information processing apparatus. Also in the second embodiment, the device driver notifies the BIOS of the acquired bus numbers. The received bus numbers are stored by the BIOS in the bus number table. The second embodiment will be described below with reference to FIGS. 13 to 15. Components common with the first embodiment will be given the same symbols and not be described.

Figure 13:
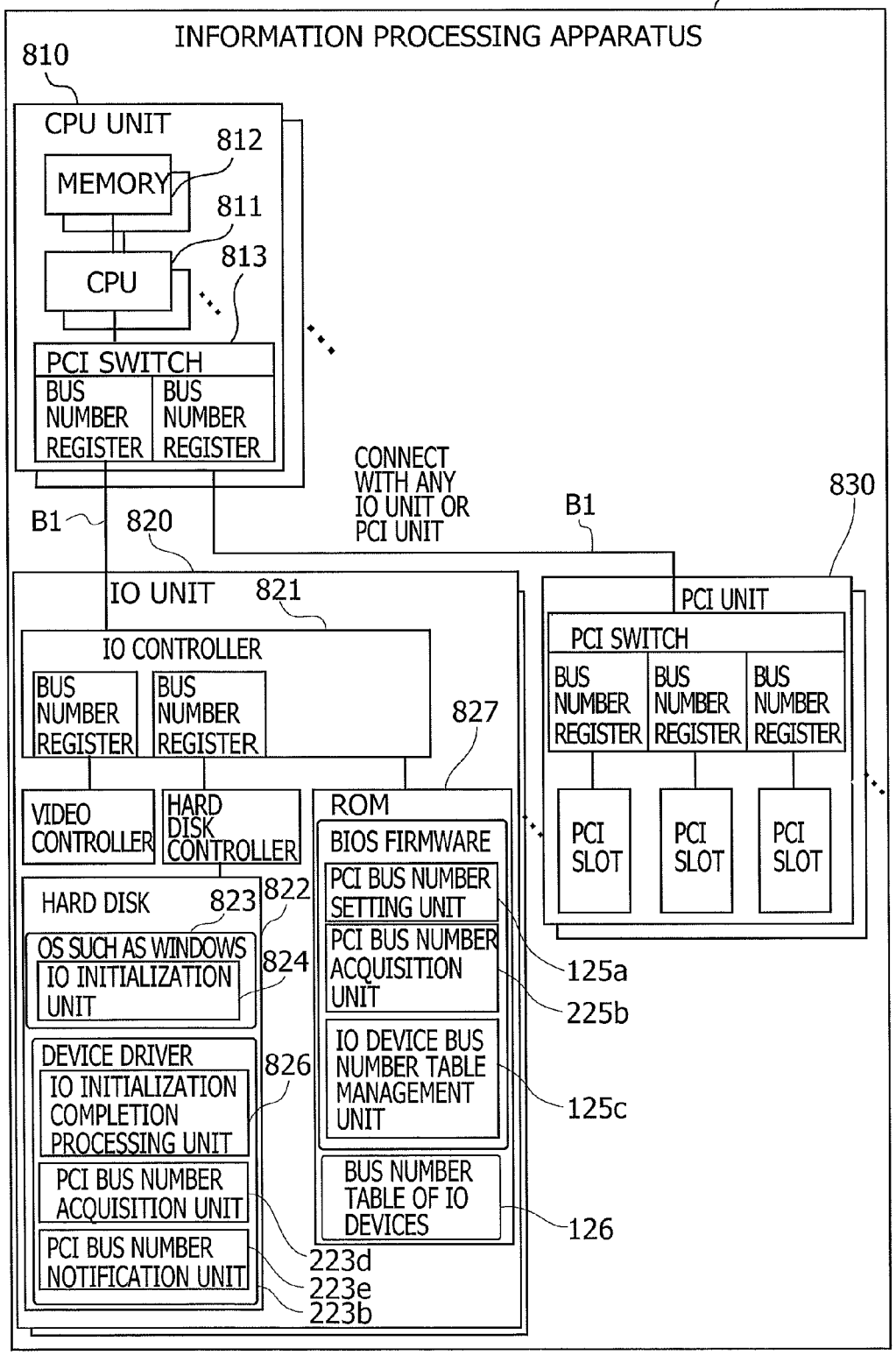
FIG. 13 is a diagram illustrating a configuration of an information processing apparatus in a second embodiment.

FIG. 13 is a diagram illustrating an information processing apparatus 200 in the second embodiment. Unlike the information processing apparatus 100 in the first embodiment, the information processing apparatus 200 has a device driver 223b installed on the OS 823. Also, unlike the information processing apparatus 100 in the first embodiment, the information processing apparatus 200 has a BIOS firmware 225 stored in the ROM 827.

The device driver 223b, which is software for controlling IO devices connected to the information processing apparatus 200, is installed on the OS 823. The device driver 223b includes the IO initialization completion processing unit 826, a PCI bus number acquisition unit 223d, and a PCI bus number notification unit 223e. The OS 823 and the device driver 223b are loaded from the hard disk 822 onto the memory 812 of the CPU unit 810 and executed by the CPU 811.

The PCI bus number acquisition unit 223d acquires bus numbers assigned to the IO devices. The PCI bus number notification unit 223e notifies a PCI bus number reception unit 225b in the BIOS firmware 225 of the bus numbers acquired by the PCI bus number acquisition unit 223d. For example, the PCI bus number notification unit 223e uses a runtime service provided by the BIOS 225 to notify the PCI bus number reception unit 225b of the bus numbers.

The ROM 827 stores the BIOS firmware 225 and the bus number table 126, for example. The BIOS firmware 225 will also be referred to as a BIOS 225 hereinafter. The BIOS 225 includes the PCI bus number setting unit 125a, the PCI bus number reception unit 225b, and the IO device bus number table management unit 125c.

The PCI bus number reception unit 225b of the BIOS 225 receives the bus numbers assigned to the IO devices from the PCI bus number notification unit 223e.

Figure 14:
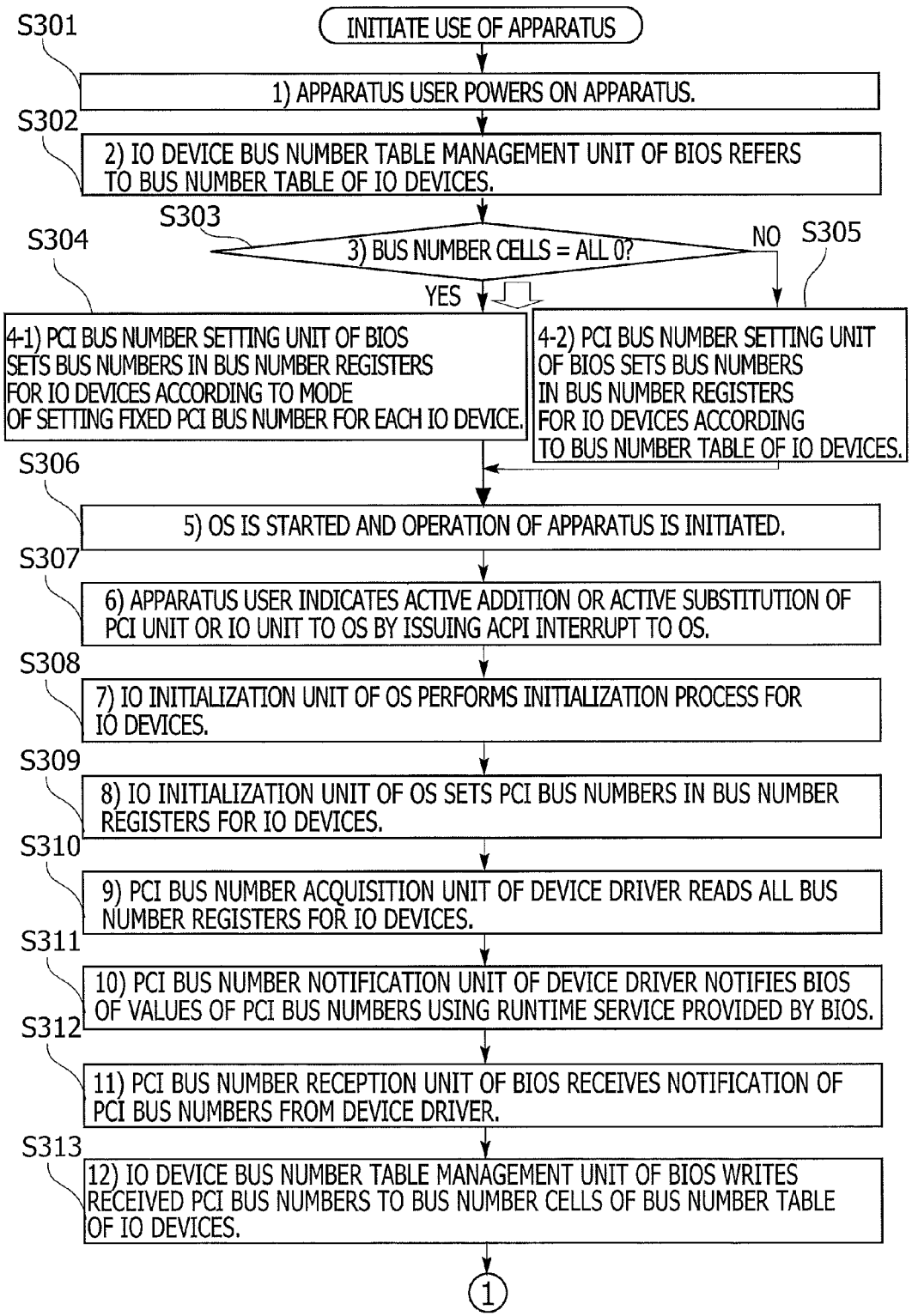
FIG. 14 is a diagram illustrating a flow of processing in which a PCI unit is actively added or actively substituted in the information processing apparatus in the second embodiment.
Figure 15:
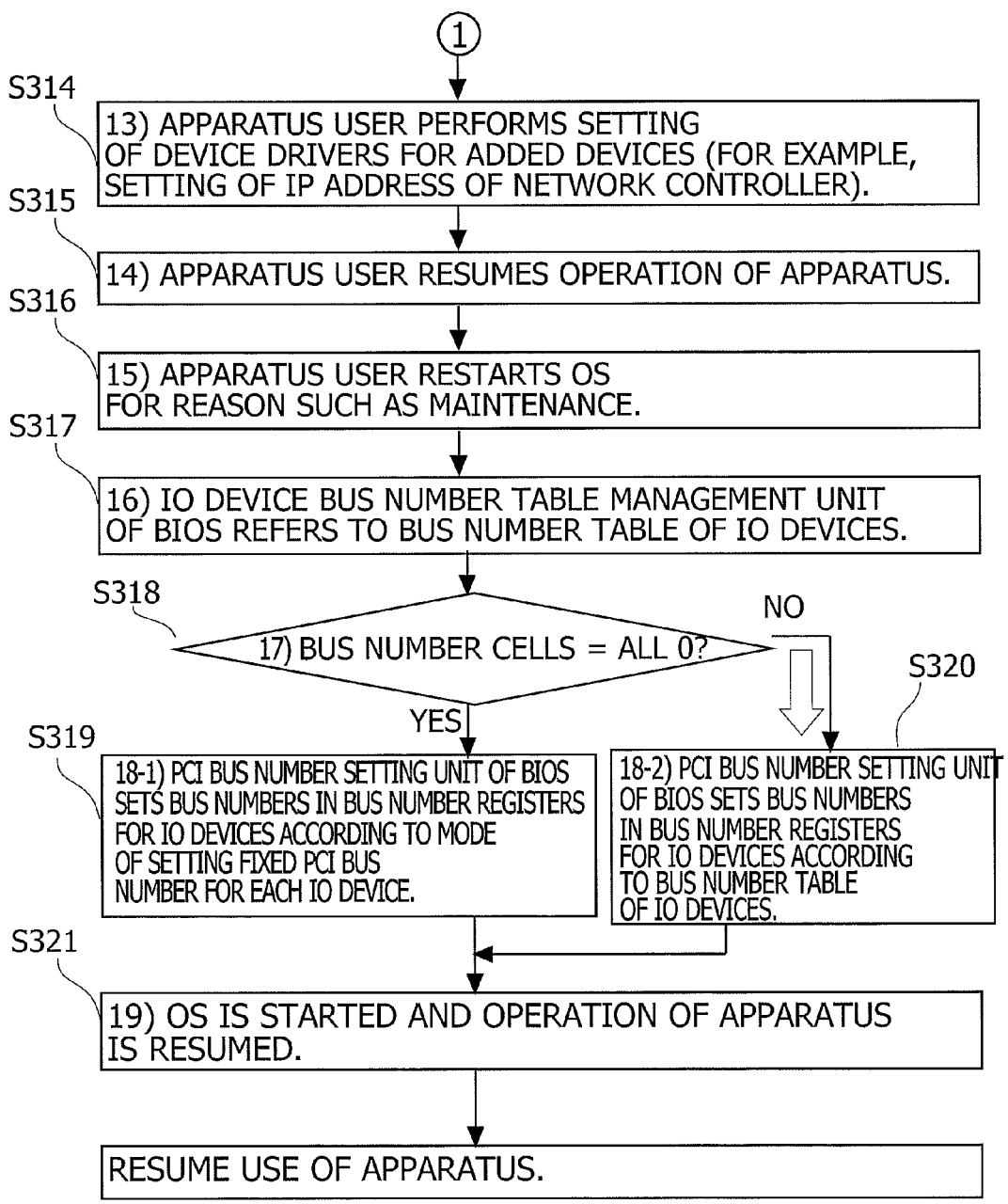
FIG. 15 is a diagram illustrating the flow of the processing in which the PCI unit is actively added or actively substituted in the information processing apparatus in the second embodiment.

FIGS. 14 and 15 are diagrams illustrating a flow of processing in which a PCI unit is actively added or actively substituted in the information processing apparatus 200 in the second embodiment. Description here assumes that the PCI unit 1 is actively added as in FIG. 4 to the information processing apparatus 200 started in the configuration of FIG. 3. The flow of processing in which the PCI unit 1 is actively added or actively substituted in the information processing apparatus 200 will be described below with reference to FIGS. 14 and 15.

FIG. 14 describes processing in which bus numbers assigned to the PCI unit 1 and the IO devices included in the PCI unit 1 are written to the bus number management table 126 when the PCI unit 1 is actively added to the information processing apparatus 200 in operation. Processes in S301 to S309 in FIG. 14 are the same as in S201 to S209 in FIG. 10 and therefore will not be described.

S310 to S313 describe processes in which the bus numbers of the IO devices acquired by the device driver 223b are written by the BIOS 225 to the bus number table 126.

In S310, the PCI bus number acquisition unit 223d of the device driver 223b reads the bus number registers for all IO devices connected to the information processing apparatus 200. However, the process in S310 is not limited to the process of reading the bus numbers of all IO devices connected to the information processing apparatus 200. For example, the PCI bus number acquisition unit 223d may read bus number registers for IO devices with their bus numbers assigned by the IO initialization unit 824 of the OS 823.

In S311, the PCI bus number notification unit 223e of the device driver 223b notifies the PCI bus number reception unit 225b in the BIOS 225 of the bus numbers acquired in S310 and connection paths. The connection paths here refer to information identifying paths from the IO devices with their bus numbers read in S310 to the information processing apparatus 200. For example, the PCI bus number notification unit 223e may use a runtime service provided by the BIOS 225 to notify the PCI bus number reception unit 225b of the bus numbers and the connection paths. The process in S311 is an example of the process of "notification of the address information assigned by the second assigning."

In S312, the PCI bus number reception unit 225b receives the notification of the bus numbers and the connection paths from the PCI bus number notification unit 223e.

In S313, the IO device bus number table management unit 125c writes each bus number received by the PCI bus number reception unit 225b to the column of bus number 12 of the bus number table 126, in a row corresponding to the relevant connection path (see the unit 10 and the device 11 in FIG. 11). The process in S313 is an example of the "updating."

Through the above-described processes in S301 to S313, the bus numbers assigned to the actively added or actively substituted IO devices are stored in the bus number table 126.

FIG. 15 describes processing in which the information processing apparatus 200 continuously operating after the active addition or active substitution of the PCI unit 1 is restarted. Processes in S314 to S321 in FIG. 15 are the same as in S213 to S220 in FIG. 12 and therefore will not be described.

In the second embodiment, upon notification of bus numbers from the PCI bus number notification unit 223e of the device driver 223b, the IO device bus number table management unit 125c of the BIOS 225 stores the received bus numbers in the bus number table 126. Thus, in the second embodiment, bus numbers assigned by the PCI bus number setting unit 125a of the BIOS 225 and by the IO initialization unit 824 of the OS 823 can be stored in the bus number table 126.

In the second embodiment, the PCI bus number setting unit 125a of the BIOS 225 refers to the bus number table 126 to assign the bus numbers to the IO devices. Thus, as in the first embodiment, changes of the bus numbers assigned to the IO devices are prevented in the second embodiment.

Third Embodiment

In the first and second embodiments, the bus number table is stored in the ROM of the IO unit. A third embodiment describes the case in which the bus number table is stored in a controller that manages the information processing apparatus. The controller that manages the information processing apparatus is also called a service processor or a baseboard management controller (BMC). Hereinafter, the controller that manages the information processing apparatus will be referred to as a service processor. The third embodiment will be described below with reference to FIGS. 16 to 18. Components common with the first embodiment will be given the same symbols and not be described.

Figure 16:
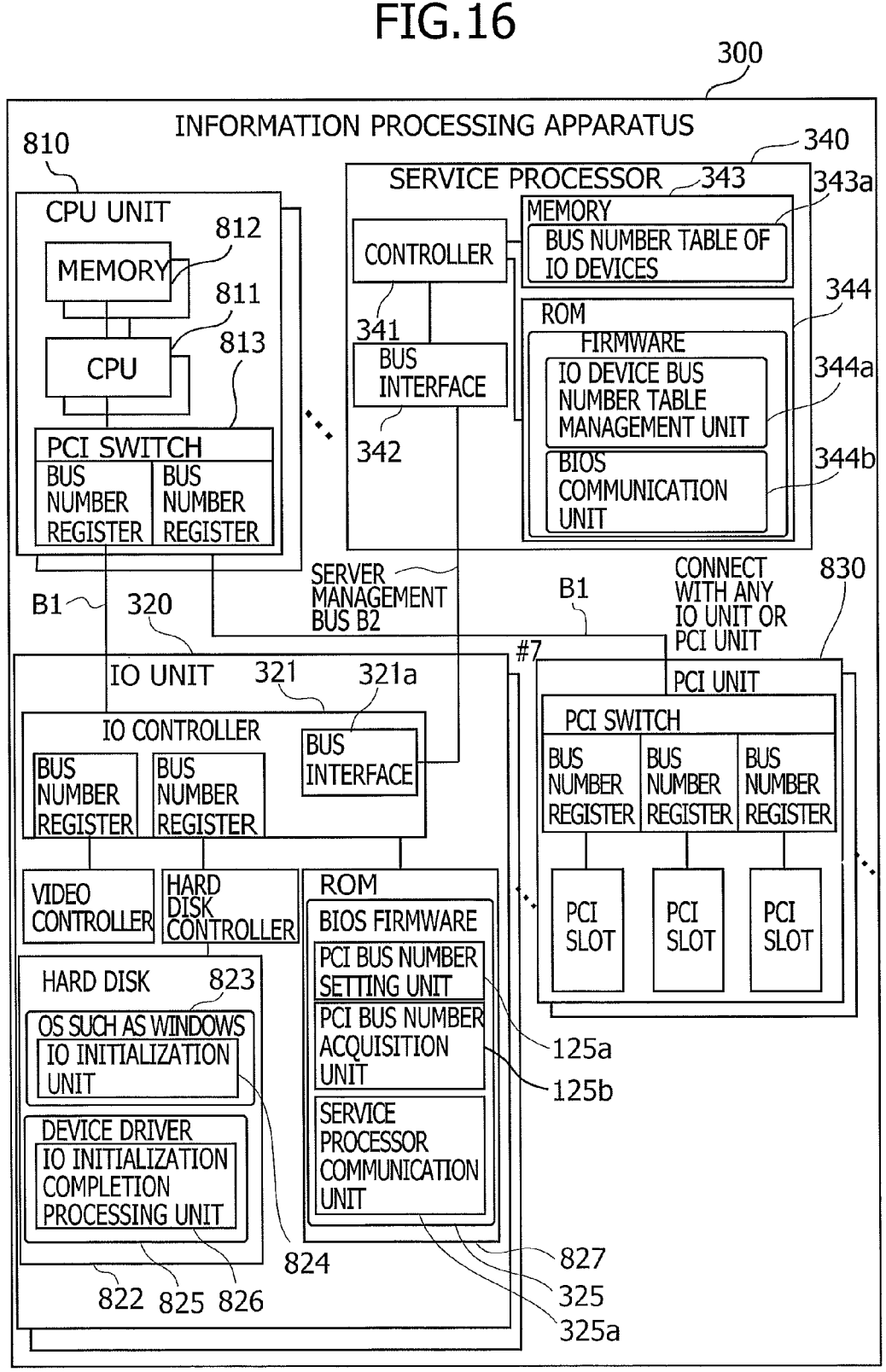
FIG. 16 is a diagram illustrating a configuration of an information processing apparatus in a third embodiment.

FIG. 16 is a diagram illustrating an information processing apparatus 300 in the third embodiment. The information processing apparatus 300 includes an IO unit 320 in place of the IO unit 820 of the information processing apparatus 100 in the first embodiment. The information processing apparatus 300 further includes a service processor 340 in addition to the configuration of the information processing apparatus 100 in the first embodiment. The IO unit 320 and the service processor 340 are connected with each other via a server management bus B2.

Unlike the IO unit 820 in the first embodiment, the IO unit 320 includes an IO controller 321 in place of the IO controller 821. The IO controller 321 further includes a bus interface 321a connected with the service processor 340, in addition to the configuration of the IO controller 821 in the first embodiment.

A BIOS firmware 325 is stored in the ROM 827. The BIOS firmware 325 will also be referred to as a BIOS 325 hereinafter. The BIOS 325 includes the PCI bus number setting unit 125a, the PCI bus number acquisition unit 125b, and a service processor communication unit 325a.

The service processor communication unit 325a communicates with the service processor 340. For example, the service processor communication unit 325a notifies the service processor 340 of bus numbers assigned to IO devices. The service processor communication unit 325a also queries the service processor 340 for bus numbers stored in a bus number table 343a of IO devices.

The service processor 340 is used for management of the information processing apparatus 300. The service processor 340 includes a controller 341, a bus interface 342, a memory 343, and a ROM 344. The service processor 340 is connected with the IO unit 320 via the server management bus B2.

The memory 343 is nonvolatile memory, for example. The memory 343 stores the bus number table 343a of IO devices. The bus number table 343a of IO devices will also be referred to as a bus number table 343a hereinafter. The bus number table 343a is the same as the bus number table 126 except that the bus number table 343a is stored on the service processor 340. The bus number table 343a is an example of the "storage unit."

Firmware stored in the ROM 344 includes an IO device bus number table management unit 344a and a BIOS communication unit 344b. The IO device bus number table management unit 344a is the same as the IO device bus number table management unit 125c except that the IO device bus number table management unit 344a is stored on the service processor 340. The IO device bus number table management unit 344a is an example of the "updating." The BIOS communication unit 344b communicates between the service processor 340 and the BIOS 325. For example, the BIOS communication unit 344b notifies the service processor communication unit 325a of the bus numbers stored in the bus number table 343a. For example, the BIOS communication unit 344b receives the bus numbers assigned to the IO devices from the service processor communication unit 325a.

FIGS. 17 and 18 are diagrams illustrating a flow of processing in which a PCI unit is actively added or actively substituted in the information processing apparatus 300. Description here assumes that the PCI unit 1 is actively added as in FIG. 4 to the information processing apparatus 300 started in the configuration of FIG. 3. The flow of processing in which the PCI unit 1 is actively added or actively substituted in the information processing apparatus 300 will be described below with reference to FIGS. 17 and 18.

The process in S401 of FIG. 17 is the same as in S201 of FIG. 10 and therefore will not be described.

In S402, the service processor communication unit 325a of the BIOS 325 queries the service processor 340 for the bus numbers stored in the bus number table 343a. The service processor communication unit 325a may use an Intelligent Platform Management Interface (IPMI) command for querying the service processor 340. IPMI is an interface used for monitoring the hardware of the information processing apparatus 300, for example.

In S403, the IO device bus number table management unit 344a of the service processor 340 refers to the bus number table 343a of the service processor 340. The IO device bus number table management unit 344a checks whether the bus numbers stored in bus number 12 of the bus number table 343a are all 0.

In S404, the BIOS communication unit 344b of the service processor 340 notifies the BIOS 325 of the bus numbers stored in the bus number table 343a.

Processes in S405 to S413 are the same as in S203 to S211 in FIG. 10 and therefore will not be described.

In S414 to S415, the service processor communication unit 325a of the BIOS 325 notifies the BIOS communication unit 344b in the service processor 340 of the bus numbers acquired by the PCI bus number acquisition unit 125b of the BIOS 325. For example, the service processor communication unit 325a may use an IPMI command to notify the BIOS communication unit 344b of the bus numbers.

In S416, the IO device bus number table management unit 344a of the service processor 340 writes the bus numbers received by the BIOS communication unit 344b to the bus number management table 343a. The process in S416 is an example of the "updating."

Processes in S417 to S419 are the same as in S213 to S215 of FIG. 12 and therefore will not be described.

Processes in S420 to S422 are the same as in S402 to S404 of FIG. 17 and therefore will not be described. Processes in S423 to S426 are the same as in S217 to S220 of FIG. 12 and therefore will not be described.

In the third embodiment, the IO device bus number table management unit 344a stores bus numbers assigned to IO devices in the bus number table 343a in response to active addition or active substitution of an IO device. Thus, in the third embodiment, bus numbers assigned by the PCI bus number setting unit 125a of the BIOS 325 and by the IO initialization unit 824 of the OS 823 can be stored in the bus number table 343a.

In the third embodiment, the PCI bus number setting unit 125a of the BIOS 325 refers to the bus number table 343a to assign the bus numbers to the IO devices. Thus, as in the first embodiment, changes of the bus numbers assigned to the IO devices are prevented in the third embodiment.

The embodiments disclosed above and their variations may be combined with each other.

The information processing apparatus can prevent changes of address information assigned to IO devices connected to the information processing apparatus even if an IO device is added or disconnected.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An address information management apparatus, comprising:
a storage unit that stores a relationship between a device connected to the address information management apparatus and address information assigned to the device; and
a processor executing a process that causes the address information management apparatus to perform:
first assigning, when the relationship is stored in the storage unit at startup of the address information management apparatus, the address information to the device being connected to the address information management apparatus according to the relationship stored in the storage unit, and, when the relationship is not stored in the storage unit at the startup of the address information management apparatus, address information to the device being connected to the address information management apparatus according to a predetermined procedure; and
updating, in response to a second assigning, the relationship stored in the storage unit, when further address information is assigned in the second assigning to a new device additionally connected to the address information management apparatus during operation of the address information management apparatus so that the further address information does not overlap the address information assigned to the device already connected to the address information management apparatus.

2. The address information management apparatus according to claim 1, wherein in response to a notification of completion of address assignment in the second assigning, the processor executes the process that further causes the address information management apparatus to perform acquiring, from all devices connected to the address information management apparatus, address information assigned to the all devices and updating the relationship stored in the storage unit.

3. The address information management apparatus according to claim 1, wherein the updating includes updating the relationship stored in the storage unit in response to a notification of the address information assigned in the second assigning.

4. The address information management apparatus according to claim 1, wherein the first assigning is performed by a Basic Input Output System (BIOS) of the address information management apparatus and the second assigning is performed by an Operation System (OS) of the address information management apparatus.

5. The address information management apparatus according to claim 1, wherein the second assigning is performed when addition of the device to the address information management apparatus is notified by an interrupt.

6. An address information management method, wherein an address information management apparatus comprising a storage unit that stores relationship between device connected to the address information management apparatus and address information assigned to the device, the method comprising:
first assigning, when the relationship is stored in the storage unit at the startup of the address information management apparatus, the address information to the device being connected to the address information management apparatus according to the relationship stored in the storage unit, and, when the relationship is not stored in the storage unit at the startup of the address information management apparatus, address information to the device being connected to the address information management apparatus according to a predetermined procedure; and
updating, in response to a second assigning, the relationship stored in the storage unit, when further address information is assigned in the second assigning to a new device additionally connected to the address information management apparatus during operation of the address information management apparatus so that the further address information does not overlap the address information assigned to the device already connected to the address information management apparatus.

7. The address information management method according to claim 6, wherein in response to a notification of completion of address assignment in the second assigning, the method further comprises acquiring, from all devices connected to the address information management apparatus, address information assigned to the all devices, and updating the relationship stored in the storage unit.

8. The address information management method according to claim 6, wherein the updating includes updating the relationship stored in the storage unit in response to a notification of the address information assigned in the second assigning.

9. The address information management method according to claim 6, wherein the first assigning is performed by a Basic Input Output System (BIOS) of the address information management apparatus and the second assigning is performed by an Operation System (OS) of the address information management apparatus.

10. The address information management method according to claim 6, wherein the second assigning is performed when addition of the device to the address information management apparatus is notified by an interrupt.

11. A non-transitory computer-readable recording medium having stored therein a program for causing an address information management apparatus including a processor and a storage unit that stores relationship between device connected to the address information management apparatus and address information assigned to the device, the program to cause the processor to perform:

first assigning, when the relationship is stored in the storage unit at the startup of the address information management apparatus, the address information to the device being connected to the address information management apparatus according to the relationship stored in the storage unit, and, when the relationship is not stored in the storage unit at the startup of the address information management apparatus, address information to the device being connected to the address information management apparatus according to a predetermined procedure; and updating, in response to a second assigning, the relationship stored in the storage unit, when further address information is assigned in the second assigning to a new device additionally connected to the address information management apparatus during operation of the address information management apparatus so that the further address information does not overlap the address information assigned to the device already connected to the address information management apparatus.

12. The non-transitory computer-readable recording medium having stored therein the program according to claim 11, wherein in response to a notification of completion of address assignment in the second assigning, the program to cause the processor to further perform acquiring, from all devices connected to the address information management apparatus, address information assigned to the all devices, and updating the relationship stored in the storage unit.

13. The non-transitory computer-readable recording medium having stored therein the program according to claim 11, wherein the updating includes updating the relationship stored in the storage unit in response to a notification of the address information assigned in the second assigning.

14. The non-transitory computer-readable recording medium having stored therein the program according to claim 11, wherein the first assigning is performed by a Basic Input Output System (BIOS) of the address information management apparatus and the second assigning is performed by an Operation System (OS) of the address information management apparatus.

15. The non-transitory computer-readable recording medium having stored therein the program according to claim 11, wherein the second assigning is performed when addition of the device to the address information management apparatus is notified by an interrupt.

\* \* \* \* \*